United States Patent
Konda

(10) Patent No.: US 7,378,938 B2
(45) Date of Patent: May 27, 2008

(54) STRICTLY NONBLOCKING MULTICAST MULTI-STAGE NETWORKS

(75) Inventor: Venkat Konda, San Jose, CA (US)

(73) Assignee: Teak Technologies, Inc., Santa Clara, CA (US)

( * ) Notice: Subject to any disclaimer, the term of this patent is extended or adjusted under 35 U.S.C. 154(b) by 0 days.

(21) Appl. No.: 10/999,649

(22) Filed: Nov. 27, 2004

(65) Prior Publication Data

US 2005/0105517 A1 May 19, 2005

Related U.S. Application Data

(63) Continuation of application No. 09/967,106, filed on Sep. 27, 2001, now Pat. No. 6,868,084.

(51) Int. Cl.
*H03K 17/00* (2006.01)
*H04Q 3/68* (2006.01)

(52) U.S. Cl. .................. 340/2.22; 370/395.1; 370/388; 398/78

(58) Field of Classification Search ............. 370/395.1, 370/388; 340/2.22; 398/78
See application file for complete search history.

(56) References Cited

U.S. PATENT DOCUMENTS

| | | | |
|---|---|---|---|
| 3,980,834 A | 9/1976 | Akiyama et al. | |
| 4,038,638 A | 7/1977 | Hwang | |
| 4,566,007 A | 1/1986 | Richards | |
| 5,023,864 A | 6/1991 | Cloonan et al. | |
| 5,179,551 A | 1/1993 | Turner | |
| 5,276,425 A | 1/1994 | Swanson et al. | |
| 5,291,477 A | 3/1994 | Liew | |
| 5,451,936 A | 9/1995 | Yang et al. | |
| 5,544,160 A | 8/1996 | Cloonan et al. | |
| 5,801,641 A | 9/1998 | Yang et al. | |

OTHER PUBLICATIONS

V.E. Benes, "Mathematical Theory of Connecting Networks and Telephone Traffic" (Academic Press, 1965).
Y. Yang, and G.M., Masson, "Nonblocking Broadcast Switching Networks" IEEE Transactions on Computers, vol. 40, No. 9, Sep. 1991.
G. M. Masson & B. W. Jordan, "Generalized Multi-Stage Connection Networks" Networks, 2: pp. 191-209, 1972 by John Wiley and Sons, Inc.

(Continued)

*Primary Examiner*—Brian Zimmerman
*Assistant Examiner*—Nam Nguyen
(74) *Attorney, Agent, or Firm*—Cooley Godward Kronish LLP

(57) ABSTRACT

A three-stage network is operated in strictly nonblocking manner and includes an input stage having $r_1$ switches and $n_1$ inlet links for each of $r_1$ switches, an output stage having $r_2$ switches and $n_2$ outlet links for each of $r_2$ switches. The network also has a middle stage of m switches, and each middle switch has at least one link connected to each input switch for a total of at least $r_1$ first internal links and at least one link connected to each output switch for a total of at least $r_2$ second internal links, where $m \geq 2*n_1+n_2-1$. In one embodiment, each multicast connection is set up through such a three-stage network by use of at most two switches in the middle stage.

17 Claims, 18 Drawing Sheets

OTHER PUBLICATIONS

F. K. Hwang, "Rearrangeability of Multi-Connection Three-Stage Clos Networks", Networks, 2: pp. 301-306, 1972 by John Wiley and Sons, Inc.

Gaylord W. Richards and Frank K. Hwang, "A Two-Stage Rearrangeable Broadcast Switching Network". IEEE Transactions on Communications, vol. COMM-33, No. 10, Oct. 1985, pp. 1025-.

Charles Clos "A Study of Non-Blocking Switching Networks", The Bell System Technical Journal, vol. XXXII, Jan. 1953, No. 1, pp. 406-424.

D.S. Kim, and D. Du, "Performance of Split Routing Algorithm for three-stage multicast networks", IEEE/ACM Transactions on Networking, vol. 8, No. 4, Aug. 2000.

F.K. Hwang, "Three-stage multiconnection networks which are nonblocking in the wide sense", The Bell systems technical journal, vol. 58, No. 10, Dec. 1979.

D. G. Cantor, "On Non-blocking Switching Networks", Networks, 1: pp. 367-377, 1972 by John Wiley and Sons, Inc.

F. K. Hwang and A. Jajszczyk, "On nonblocking multiconnection networks," IEEE Trans. Communications, vol. COM-34, pp. 1038-1041, 1986.

G. M. Masson, "Binomial switching networks for concentration and distribution," IEEE Trans. Communications, vol. Com-25, pp. 873-884, 1977.

G.M. Masson, "Upper Bounds on Fanout in Connection Networks", IEEE Transactions on Circuit Theory, vol. CT-20 No. 3, May 1973.

STRICTLY NONBLOCKING MULTICAST MULTI-STAGE NETWORKS

CROSS REFERENCE TO RELATED APPLICATIONS

This is a Continuation Application and claims priority of U.S. patent application Ser. No. 09/967,106, now U.S. Pat. No. 6,868,084, entitled "STRICTLY NON-BLOCKING MULTICAST MULTI-STAGE NETWORKS" by Venkat Konda assigned to the same assignee as the current application and filed Sep. 27, 2001, which is incorporated by reference in its entirety. This application is related to and incorporates by reference in its entirety the related U.S. patent application Ser. No. 09/967,815, now U.S. Pat. No. 6,885,669, entitled "REARRANGEABLY NON-BLOCKING MULTICAST MULTI-STAGE NETWORKS" by Venkat Konda assigned to the same assignee as the current application, filed on 27, Sep. 2001, and its Continuation Application U.S. patent application Ser. No. 10/999,757 filed Nov. 27, 2004.

CROSS REFERENCE TO CD-ROM APPENDIX

Appendix A includes software written in the C programming language for a prototype of a scheduling method to set up connections through a three-stage network. The C code is compilable by Visual C++ compiler, version 6.0 available from Microsoft Corporation, to form an executable file for use in an IBM compatible personal computer. Appendix A also includes documentation in a readme file for the C code and also instructions on how to compile and execute the C code.

```
                                            cddir
Volume in drive D is 010925_1627
Volume Serial Number is 08C3-4D4A
Directory of D:\
09/25/01            04:27p      <DIR>
09/25/01   04:27p   <DIR>
09/25/01   04:27p   <DIR>                   M-1222~1
           3 File(s)                        0 bytes
Directory of D:\M-1222~1
09/25/01   04:27p   <DIR>
09/25/01   04:27p   <DIR>
09/21/01   11:42a    57,057 OUT1.RTF
09/21/01   11:36a     1,600 README.TXT
09/21/01   11:42a    30,378 SNB.C
5 File(s)            89,035 bytes
Total Files Listed:
8 File(s)            89,035 bytes
                          0 bytes free
```

A portion of the disclosure of this patent document contains material which is subject to copyright protection. The copyright owner has no objection to the facsimile reproduction by anyone of the patent document or patent disclosure, as it appears in the U.S. Patent and Trademark Office patent files or records, but otherwise reserves all copyrights whatsoever.

BACKGROUND OF INVENTION

As is well known in the art, a Clos switching network is a network of switches configured as a multi-stage network so that fewer switching points are necessary to implement connections between its inlet links (also called "inputs") and outlet links (also called "outputs") than would be required by a single stage (e.g. crossbar) switch having the same number of inputs and outputs. Clos networks are very popularly used in digital crossconnects, switch fabrics and parallel computer systems. However Clos networks may block some of the connection requests.

There are generally three types of nonblocking networks: strictly nonblocking; wide sense nonblocking; and rearrangeably nonblocking (See V. E. Benes, "Mathematical Theory of Connecting Networks and Telephone Traffic" Academic Press, 1965 that is incorporated by reference, as background). In a rearrangeably nonblocking network, a connection path is guaranteed as a result of the network's ability to rearrange prior connections as new incoming calls are received. In strictly nonblocking network, for any connection request from an inlet link to some set of outlet links, it is always possible to provide a connection path through the network to satisfy the request without disturbing other existing connections, and if more than one such path is available, any path can be selected without being concerned about realization of future potential connection requests. In wide-sense nonblocking networks, it is also always possible to provide a connection path through the network to satisfy the request without disturbing other existing connections, but in this case the path used to satisfy the connection request must be carefully selected so as to maintain the nonblocking connecting capability for future potential connection requests.

U.S. Pat. No. 5,451,936 entitled "Non-blocking Broadcast Network" granted to Yang et al. is incorporated by reference herein as background of the invention. This patent describes a number of well known nonblocking multi-stage switching network designs in the background section at column 1, line 22 to column 3, 59.

An article by Y. Yang, and G. M., Masson entitled, "Non-blocking Broadcast Switching Networks" IEEE Transactions on Computers, Vol. 40, No. 9, September 1991 that is incorporated by reference as background indicates that if the number of switches in the middle stage, m, of a three-stage network satisfies the relation $m \geq \min((n-1)(x+r^{1/x}))$ where $1 \leq x \leq \min(n-1,r)$, the resulting network is nonblocking for multicast assignments. In the relation, r is the number of switches in the input stage, and n is the number of inlet links in each input switch. Kim and Du (See D. S. Kim, and D. Du, "Performance of Split Routing Algorithm for three-stage multicast networks", IEEE/ACM Transactions on Networking, Vol. 8, No. 4, August 2000 incorporated herein by reference) studied the blocking probability for multicast connections for different scheduling algorithms.

SUMMARY OF INVENTION

A three-stage network is operated in strictly nonblocking manner in accordance with the invention includes an input stage having $r_1$ switches and $n_1$ inlet links for each of $r_1$ switches, an output stage having $r_2$ switches and $n_2$ outlet links for each of $r_2$ switches. The network also has a middle stage of m switches, and each middle switch has at least one link connected to each input switch for a total of at least $r_1$ first internal links and at least one link connected to each output switch for a total of at least $r_2$ second internal links, where $m \geq 2*n_1+n_2-1$. In one embodiment, each multicast connection is set up through such a three-stage network by use of at most two switches in the middle stage. When the number of inlet links in each input switch $n_1$ is equal to the number of outlet links in each output switch $n_2$, and $n_1=n_2=n$, a three-stage network is operated in strictly nonblocking manner in accordance with the invention if $m \geq 3*n-1$. Also in accordance with the invention, a three-stage network having more middle switches than $2*n_1+n_2-1$ is operated in strictly nonblocking manner even if some multicast connections are set up by using more than two middle switches as long as each connection has available links into at least two middle switches and there are always at least $n_1-1$ unused links from each input switch to middle switches, after each connection is set up.

DETAILED DESCRIPTION OF THE INVENTION

The present invention is concerned with the design and operation of multi-stage switching networks for broadcast, unicast and multicast connections. When a transmitting device simultaneously sends information to more than one receiving device, the one-to-many connection required between the transmitting device and the receiving devices is called a multicast connection. A set of multicast connections is referred to as a multicast assignment. When a transmitting device sends information to one receiving device, the one-to-one connection required between the transmitting device and the receiving device is called unicast connection. When a transmitting device simultaneously sends information to all the available receiving devices, the one-to-all connection required between the transmitting device and the receiving devices is called a broadcast connection.

In general, a multicast connection is meant to be one-to-many connection, which includes unicast and broadcast connections. A multicast assignment in a switching network is nonblocking if any of the available inlet links can always be connected to any of the available outlet links. In certain multi-stage networks of the type described herein, any connection request of arbitrary fan-out, i.e. from an inlet link to an outlet link or to a set of outlet links of the network, can be satisfied without blocking with never needing to rearrange any of the previous connection requests. Depending on the number of switches in a middle stage of such a network, such connection requests may be satisfied without blocking if necessary by rearranging some of the previous connection requests as described in detail in U.S. patent application, Ser. No. 09/967,815 that is incorporated by reference above.

Figure 1A:
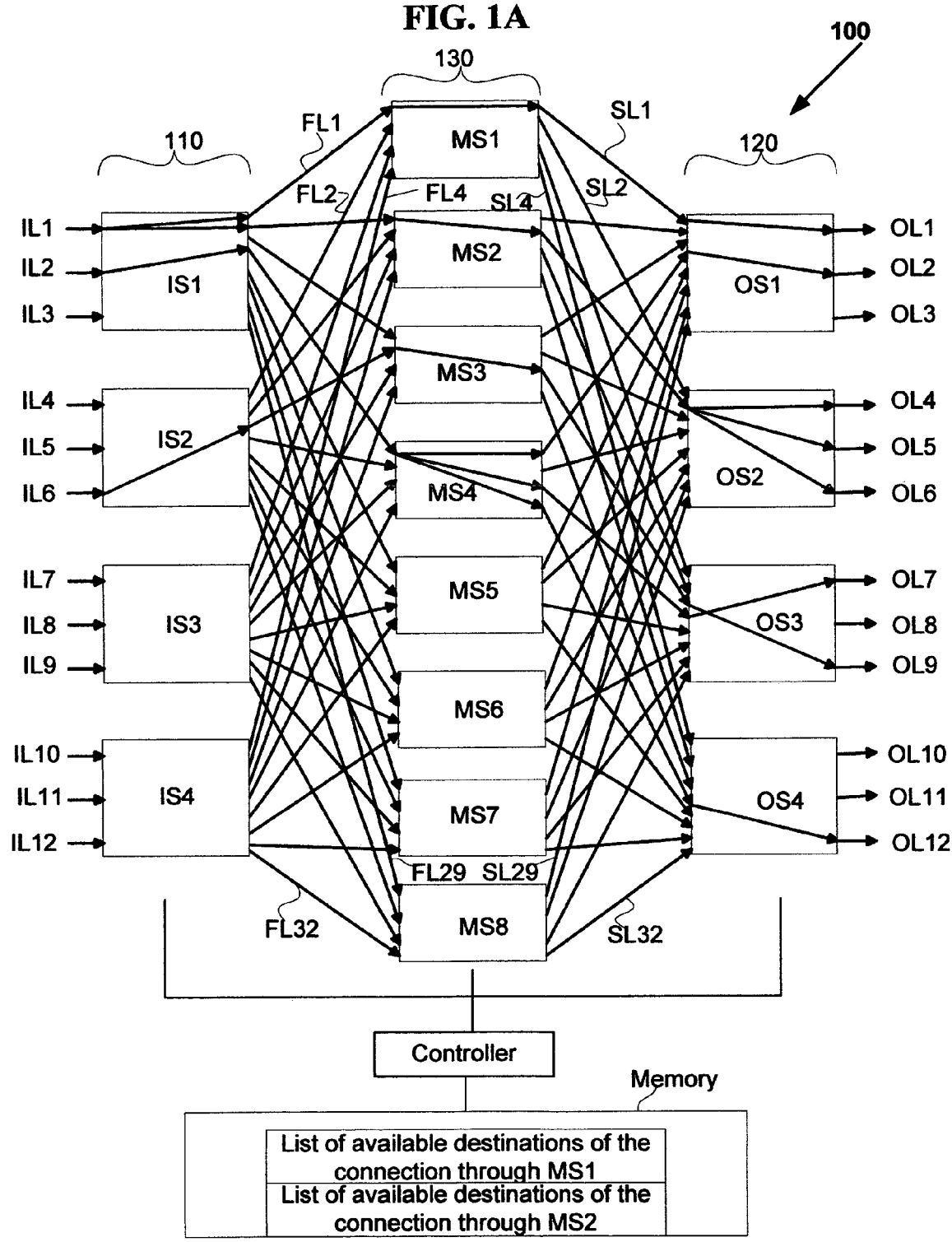
FIG. 1A is a diagram of an exemplary three-stage symmetrical network with exemplary multicast connections in accordance with the invention.

Referring to FIG. 1A, an exemplary symmetrical three-stage Clos network of sixteen switches for satisfying communication requests, such as setting up a telephone call or a data call, between an input stage 110 and output stage 120 via a middle stage 130 is shown where input stage 110 consists of four, three by eight switches IS1-IS4 and output stage 120 consists of four, eight by three switches OS1-OS4, and middle stage 130 consists of eight, four by four switches MS1-MS8. Such a network can be operated in strictly non-blocking manner, because the number of switches in the middle stage 130 (i.e. eight switches) is equal to $3*n-1$, where the n is the number of links (i.e. three inlet links) of each of the switches in the input stage 110 and output stage 120. The specific method used in implementing the strictly non-blocking connectivity can be any of a number of different methods that will be apparent to a skilled person in view of the disclosure. One such method is described below in reference to FIG. 1B.

In one embodiment of this network each of the input switches IS1-IS4 and output switches OS1-OS4 are crossbar switches. When the number of stages of the network is one, the switching network is called single-stage switching network, crossbar switching network or more simply crossbar switch. A (N*M) crossbar switching network with N inlet links and M outlet links is composed of NM cross points. As the values of N and M get larger, the cost of making such a crossbar switching network becomes prohibitively expensive.

The number of switches of input stage 110 and of output stage 120 can be denoted in general with the variable r for each stage. The number of middle switches is denoted by m. The size of each input switch IS1-IS4 can be denoted in general with the notation n*m and of each output switch OS1-OS4 can be denoted in general with the notation m*n. Likewise, the size of each middle switch MS1-MS8 can be denoted as r*r. A switch as used herein can be either a crossbar switch, or a network of switches each of which in turn may be a crossbar switch or a network of switches. A three-stage network can be represented with the notation V(m,n,r), where n represents the number of inlet links to each input switch (for example the links IL1-IL3 for the input switch IS1) and m represents the number of middle switches MS1-MS8. Although it is not necessary that there be the same number of inlet links IL1-IL12 as there are outlet links OL1-OL12, in a symmetrical network they are the same. Each of the m middle switches MS1-MS8 are connected to each of the r input switches through r links (hereinafter "first internal" links, for example the links FL1-FL4 connected to the middle switch MS1 from each of the input switch IS1-IS4), and connected to each of the output switches through r second internal links (hereinafter "second internal" links, for example the links SL1-SL4 connected from the middle switch MS1 to each of the output switch OS1-OS4).

Each of the first internal links FL1-FL32 and second internal links SL1-SL32 are either available for use by a new connection or not available if currently used by an existing connection. The input switches IS1-IS4 are also referred to as the network input ports. The input stage 110 is often referred to as the first stage. The output switches OS1-OS4 are also referred to as the network output ports. The output stage 120 is often referred to as the last stage. In a three-stage network, the second stage 130 is referred to as the middle stage. The middle stage switches MS1-MS8 are referred to as middle switches or middle ports.

In one embodiment, the network also includes a controller coupled with each of the input stage 110, output stage 120 and middle stage 130 to form connections between an inlet link IL1-IL12 and an arbitrary number of outlet links OL1-OL12. In this embodiment the controller maintains in memory a pair of lists of available destinations for the connection through a pair of middle switches (e.g. MS1 and MS2 in FIG. 1A) to implement a fan-out of two. In a similar manner a set of n lists are maintained in an embodiment of the controller that uses a fan-out of n.

Figure 1B:
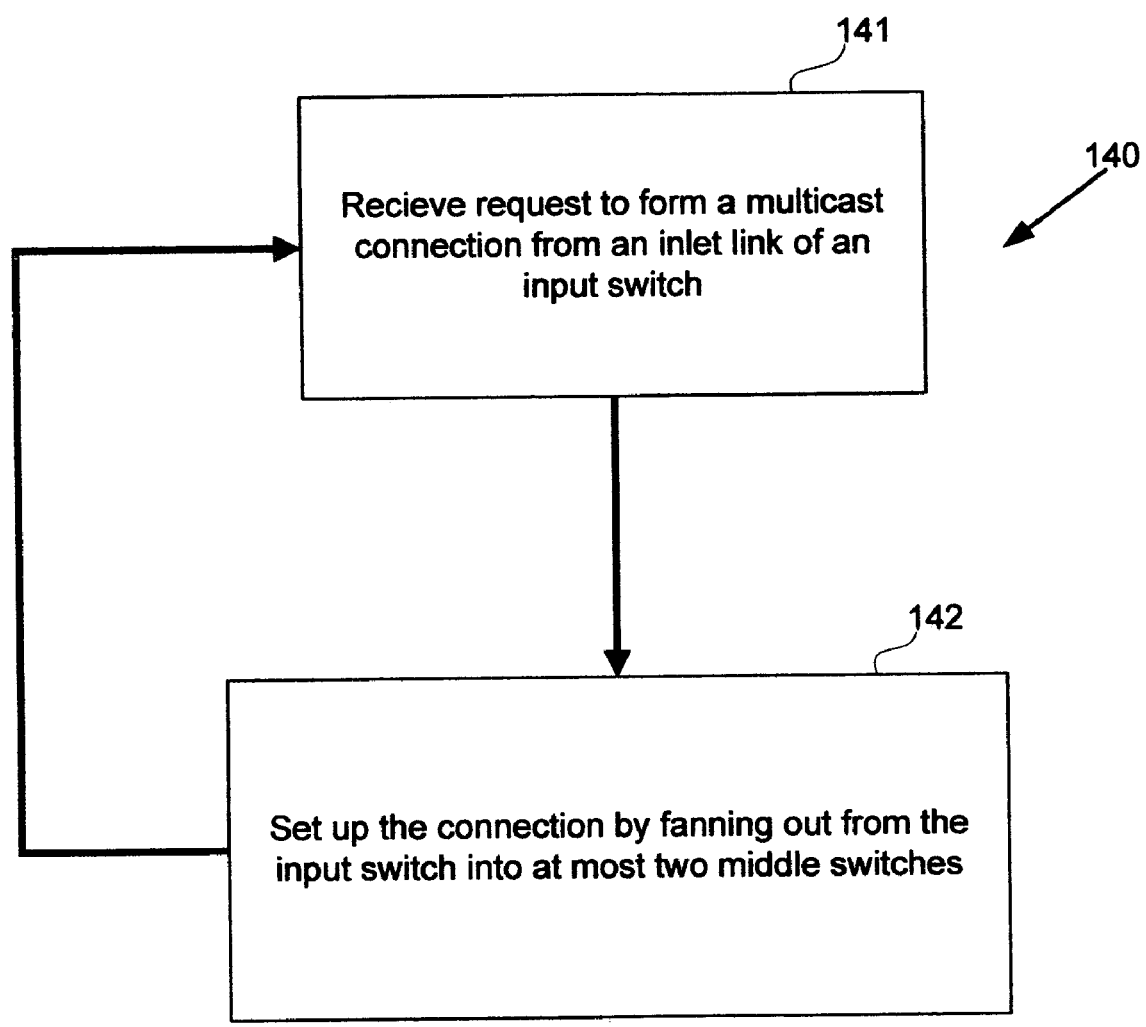
FIG. 1B is high-level flowchart of a scheduling method according to the invention, used to set up the multicast connections in the network 100 of FIG. 1A.

FIG. 1B shows a high-level flowchart of a scheduling method 140, in one embodiment executed by the controller of FIG. 1A. According to this embodiment, a multicast connection request is received in act 141. Then a connection to satisfy the request is set up in act 142 by fanning out into at most two switches in middle stage 130 from its input switch.

In the example illustrated in FIG. 1A, a fan-out of four is possible to satisfy a multicast connection request if input switch is IS2, but only two middle stage switches will be used in accordance with this method. Similarly, although a fan-out of three is possible for a multicast connection request if the input switch is IS1, again only a fan-out of two is used. The specific middle switches that are chosen when selecting a fan-out of two is irrelevant to the method of FIG. 1B so long as at most two middle switches are selected to ensure that the connection request is satisfied, i.e. the destination switches identified by the connection request can be reached from the middle switches that are part of the selected fan-out. In essence, limiting the fan-out from input switch to no more than two middle switches permits the network 100 to be operated in strictly nonblocking manner in accordance with the invention.

After act 142, the control is returned to act 141 so that acts 141 and 142 are executed in a loop for each multicast connection request. According to one embodiment as shown further below it is not necessary to have more than $3*n-1$ middle stage switches in network 100 of the FIG. 1A, where the number of inlet links IL1-IL3 equals the number of outlet links OL1-OL3, both represented by the variable n for the network to be a strictly nonblocking symmetrical switching network, when the scheduling method of FIG. 1B is used.

The connection request of the type described above in reference to method 140 of FIG. 1B can be unicast connection request, a multicast connection request or a broadcast connection request, depending on the example. In case of a unicast connection request, a fan-out of one is used, i.e. a single middle stage switch is used to satisfy the request. Moreover, although in the above-described embodiment a limit of two has been placed on the fan-out into the middle stage switches, the limit can be greater depending on the number of middle stage switches in a network, as discussed below in reference to FIG. 2A (while maintaining the strictly nonblocking nature of operation of the network). Moreover, in method 140 described above in reference to FIG. 1B any arbitrary fan-out may be used between each middle stage switch and the output stage switches, and also any arbitrary fan-out may be used within each output stage switch, to satisfy the connection request. Moreover, although method 140 of FIG. 1B has been illustrated with examples in a sixteen switch network 100 of FIG. 1A, the method 140 can be used with any general network, of the type illustrated in FIGS. 2A and 2B.

Figure 2A:
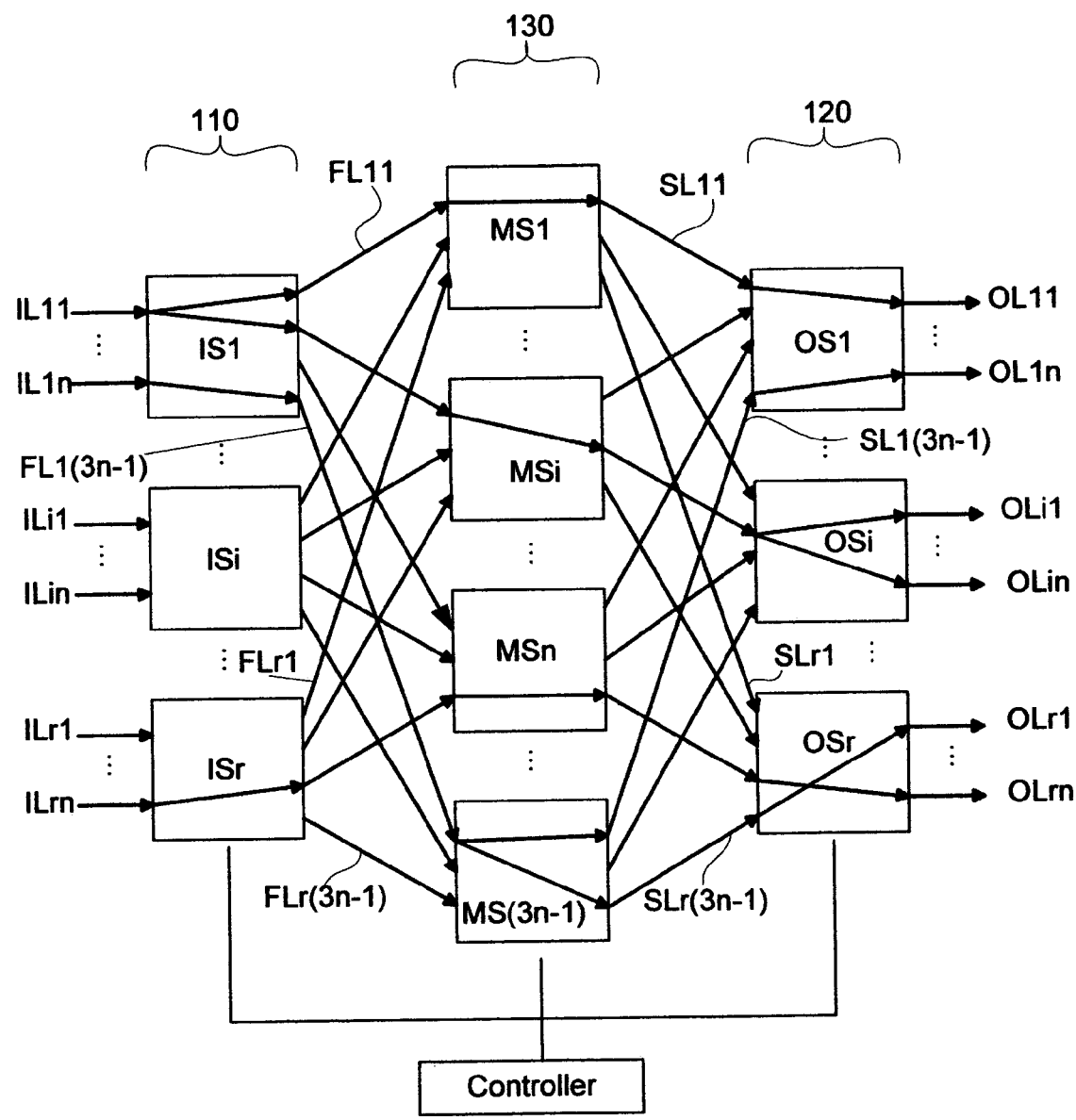
FIG. 2A is a diagram of a general symmetrical three-stage strictly nonblocking network with n inlet links in each of r input stage switches and $m=3*n-1$ middle stage switches that are used with the method of FIG. 1B in one embodiment.

Network of FIG. 1A is an example of general symmetrical three-stage network shown in FIG. 2A. The general symmetrical three-stage network can be operated in strictly nonblocking manner if $m \geq 3*n-1$ (and in the example of FIG. 2A, $m=3*n-1$), wherein has n inlet links for each of r input switches IS1-ISr (for example the links IS11-IS1$n$ to the input switch IS1) and n outlet links for each of r output switches OS1-OSr (for example OS11-OS1$n$ to the output switch OS1). Each of the m switches MS1-MSm are connected to each of the input switches through r first internal links (for example the links FL11-FLr1 connected to the middle switch MS1 from each of the input switch IS1-ISr), and connected to each of the output switches through r second internal links (for example the links SL1-SLr1 connected from the middle switch MS1 to each of the output switch OS1-OSr). In such a general symmetrical network no more than $3*n-1$ middle stage switches MS1-MS(3n-1) are necessary for the network to be strictly nonblocking, when using a scheduling method of the type illustrated in FIG. 1B. Although FIG. 2A shows an equal number of first internal links and second internal links, as is the case for a symmetrical three-stage network, the present invention, however, applies even to non-symmetrical networks of the type illustrated in FIG. 2B (described next).

Figure 2B:
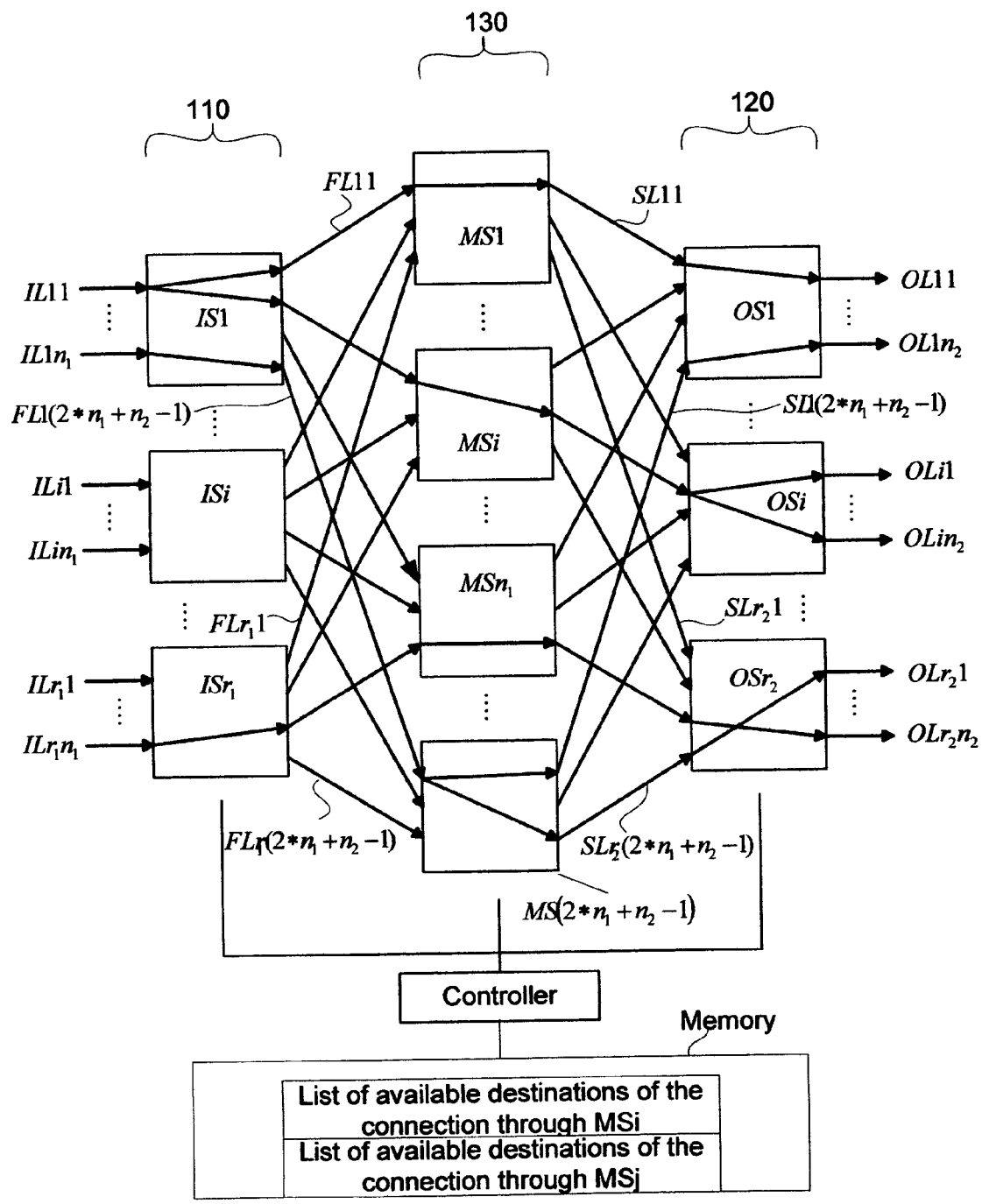
FIG. 2B is a diagram of a general non-symmetrical three-stage strictly nonblocking network with $n_1$ inlet links in each of $r_1$ input stage switches, $n_2$ outlet links in each of $r_2$ output stage switches, and $m=2*n_1+n_2-1$ middle stage switches that are used with the method of FIG. 1B in one embodiment.

In general, an ($N_1*N_2$) asymmetric network of three stages can be operated in strictly nonblocking manner if $m \geq 2*n_1+n_2-1$ (and in the example of FIG. 2B $m=2*n_1+n_2-1$), wherein network (FIG. 2B) has $r_1$ ($n_1*m$) switches IS1-IS$r_1$ in the first stage, m($r_1*r_2$) switches MS1-MSm in the middle stage, and $r_2$ ($m*n_2$) switches OS1-OS$r_2$ in the last stage where $N_1=n_1*r_1$ is the total number of inlet links and $N_2=n_2*r_2$ is the total number of outlet links of the network. Each of the m switches MS1-MS($2*n_1+n_2-1$) are connected to each of the input switches through $r_1$ first internal links (for example the links FL11-FL$r_1$1 connected to the middle switch MS1 from each of the input switch IS1-IS$r_1$), and connected to each of the output switches through $r_2$ second internal links (for example the links SL11-SL$r_2$1 connected from the middle switch MS1 to each of the output switch OS1-OSr$_2$). Such a multi-stage switching network is denoted as a V(m,n$_1$,r$_1$,n$_2$,r$_2$) network. For the special symmetrical case where n$_1$=n$_2$=n and r$_1$=r$_2$=r, the three-stage network is denoted as a V(m,n,r) network. In general, the set of inlet links is denoted as {1,2, . . . ,r$_1$n$_1$} and the set of output switches are denoted as O={1, 2, . . . ,r$_2$}. In an asymmetrical three-stage network, as shown in FIG. 2B with n$_1$ inlet links for each of r$_1$ input switches, n$_2$ outlet links for each of r$_2$ output switches, no more than 2*n$_1$+n$_2$−1 middle stage switches are necessary for the network to be strictly nonblocking, again when using the scheduling method of FIG. 1B. The network has all connections set up such that each connection passes through at most two middle switches to be connected to all destination outlet links.

Every switch in the multi-stage networks discussed herein has multicast capability. In a V(m,n$_1$,r$_1$,n$_2$,r$_2$) network, if a network inlet link is to be connected to more than one outlet link on the same output switch, then it is only necessary for the corresponding input switch to have one path to that output switch. This follows because that path can be multicast within the output switch to as many outlet links as necessary. Multicast assignments can therefore be described in terms of connections between input switches and output switches. An existing connection or a new connection from an input switch to r' output switches is said to have fan-out r'. If all multicast assignments of a first type, wherein any inlet link of an input switch is to be connected in an output switch to at most one outlet link are realizable, then multicast assignments of a second type, wherein any inlet link of each input switch is to be connected to more than one outlet link in the same output switch, can also be realized. For this reason, the following discussion is limited to general multicast connections of the first type (with fan-out r', $1 \leq r' \leq r_2$) although the same discussion is applicable to the second type.

To characterize a multicast assignment, for each inlet link i∈{1,2, . . . ,r$_1$n$_1$}, let I$_i$=O, where O ⊂ {1,2, . . . ,r$_2$}, denote the subset of output switches to which inlet link i is to be connected in the multicast assignment. For example, the network of FIG. 1A shows an exemplary three-stage network, namely V(8,3,4), with the following multicast assignment I$_1$={1,2}, I$_2$={1,3,4}, I$_6$={3} and all other I$_j$=ϕ for j=[1-12]. It should be noted that the connection I$_1$ fans out in the first stage switch IS1 into the middle stage switches MS1 and MS2, and fans out in middle switches MS1 and MS2 only once into output switches OS1 and OS2 respectively. The connection I$_1$ also fans out in the last stage switch OS1 once into outlet link OL1 and in the last stage switch OS2 into the outlet links OL4, OL5 and OL6. The connection I$_2$ fans out once in the input switch IS1 into middle switch MS4 and fans out in the middle stage switch MS4 into the last stage switches OS1, OS3 and OS4. The connection I$_2$ fans out once in the output switches OS1, OS3, and OS4 into outlet links OL2, OL7, and OL12 respectively. The connection I$_6$ fans out once in the input switch into middle switch MS3, fans out in the middle switch MS3 once into output switch OS3, fans out once in the output switch into outlet link OL9. In accordance with the invention, each connection can fan out in the first stage switch into at most two middle stage switches, and in the middle switches and last stage switches it can fan out any arbitrary number of times as required by the connection request.

Two multicast connection requests I$_i$=O$_i$ and I$_j$=O$_j$ for i≠j are said to be compatible if and only if O$_i$∩O$_j$=ϕ. It means when the requests I$_i$ and I$_j$ are compatible, and if the inlet links i and j do not belong to the same input switch, they can be set up through the same middle switch.

Figure 3A:
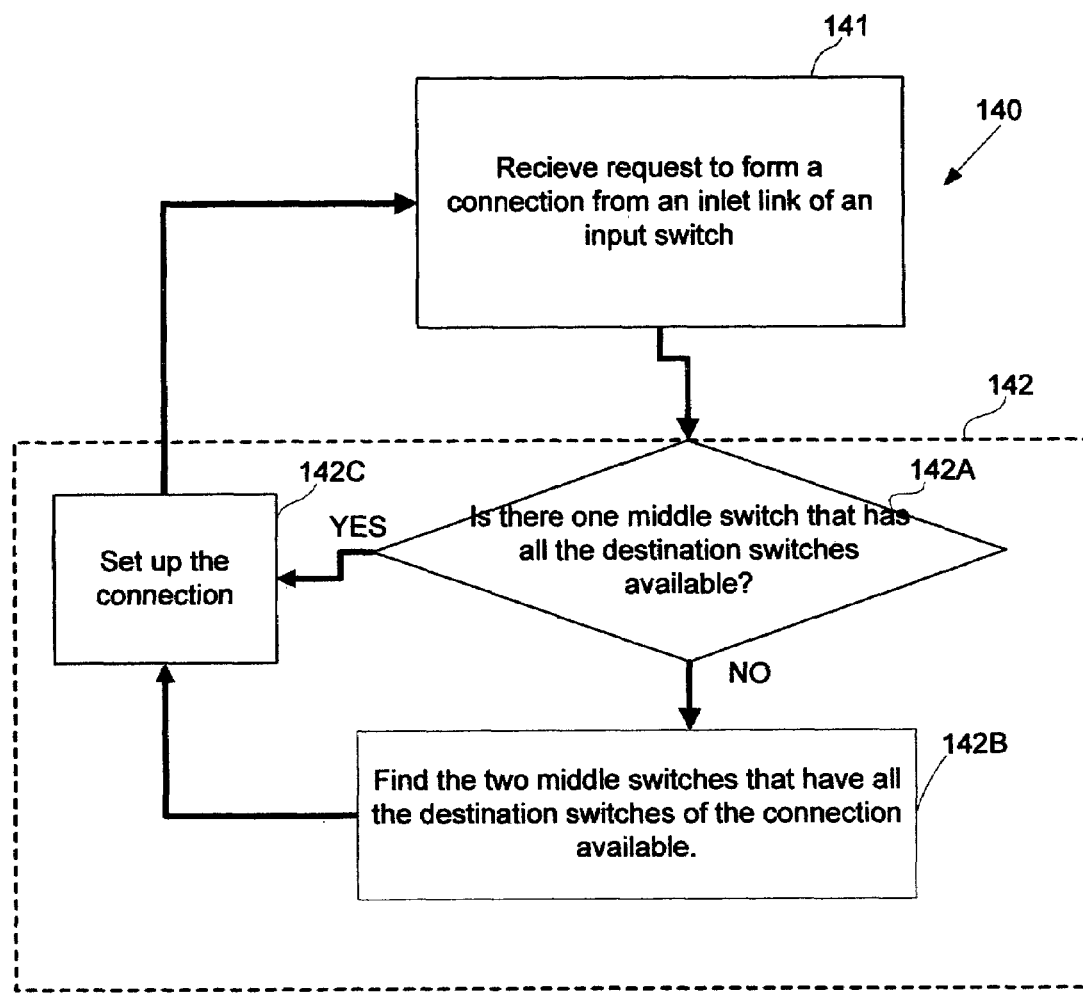
FIG. 3A is intermediate level flowchart of one implementation of the method 140 of FIG. 1B.

FIG. 3A is intermediate level flowchart of one implementation of the method of FIG. 1B. In the following "destination switch" or "destination" refers to any switch in the output stage 120 that is identified in a connection request. According to this implementation, a connection request is received in act 141. Then the method 140 checks in act 142 if the connection can be set up through only one middle switch and if act 142A finds a middle switch which has second internal links to all the destinations available then the connection is set up in act 142C and the control returns to act 141. If act 142A results in "no", the control goes to act 142B where the method 140 finds two middle switches through which the connection can be set up. Then the control goes to act 142C, where act 142C sets up the connection through the two middle switches. Therefore no more than two middle switches are used when attempting to satisfy the connection request. When the connection is set up in 142C, control returns to act 141 so that acts 141 and 142 are executed in a loop, for each connection request all the middle switches until the connection is set up.

TABLE 1

A Multicast assignment in a V(8, 3, 9)Network

| Requests for r = 1 | Requests for r = 2 | Requests for r = 3 |
|---|---|---|
| I$_1$ = {1, 2, 3}, | I$_4$ = {1, 4, 7}, | I$_7$ = {1, 5, 9}, |
| I$_2$ = {4, 5, 6}, | I$_5$ = {2, 5, 8}, | I$_8$ = {2, 6, 7}, |
| I$_3$ = {7, 8, 9}, | I$_6$ = {3, 6, 9}, | I$_9$ = {3, 4, 8} |

Table 1 above shows a multicast assignment in V(8,3,9) network. This network has a total of twenty-seven inlet links and twenty-seven outlet links. The multicast assignment in Table 1 shows nine multicast connections, three each from the first three input switches. Each of the nine connections has a fan-out of three. For example, the connection request I$_1$ has the destinations as the output switches OS1, OS2, and OS3 (referred to as 1, 2, 3 in Table 1). Request I$_1$ only shows the output switches and does not show which outlet links are the destinations. However it can be observed that each output switch is used only three times in the multicast assignment of Table 1, using all the three outlet links in each output switch. For example, output switch 1 is used in requests I$_1$, I$_4$, I$_7$, so that all three outlet links of output switch 1 are in use, and a specific identification of each outlet link is irrelevant. And so when all the nine connections are set up all the twenty-seven outlet links will be in use.

Figure 3B:
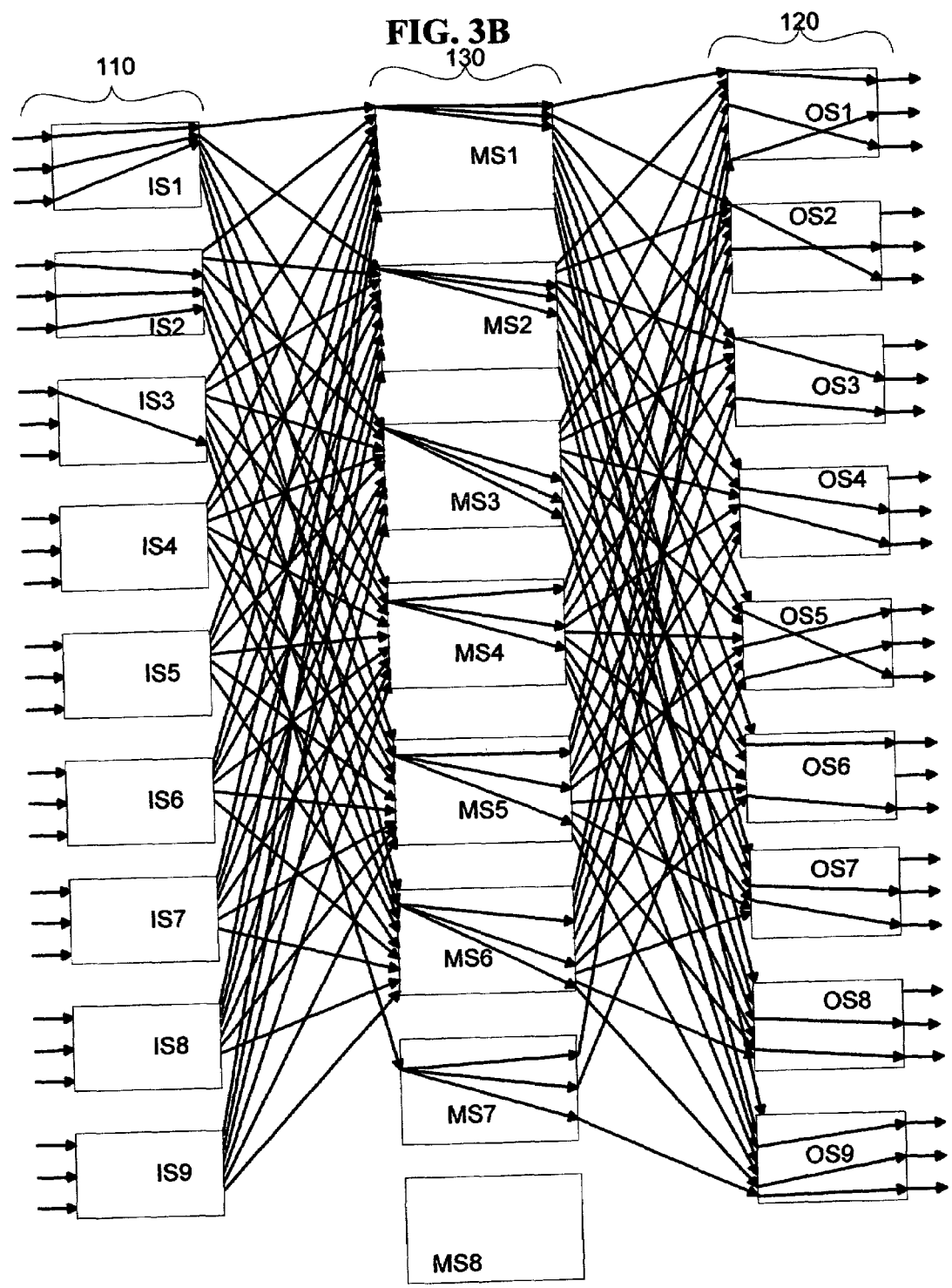
FIG. 3B shows an exemplary V(8,3,9) network with certain existing multicast connections.
Figure 3C:
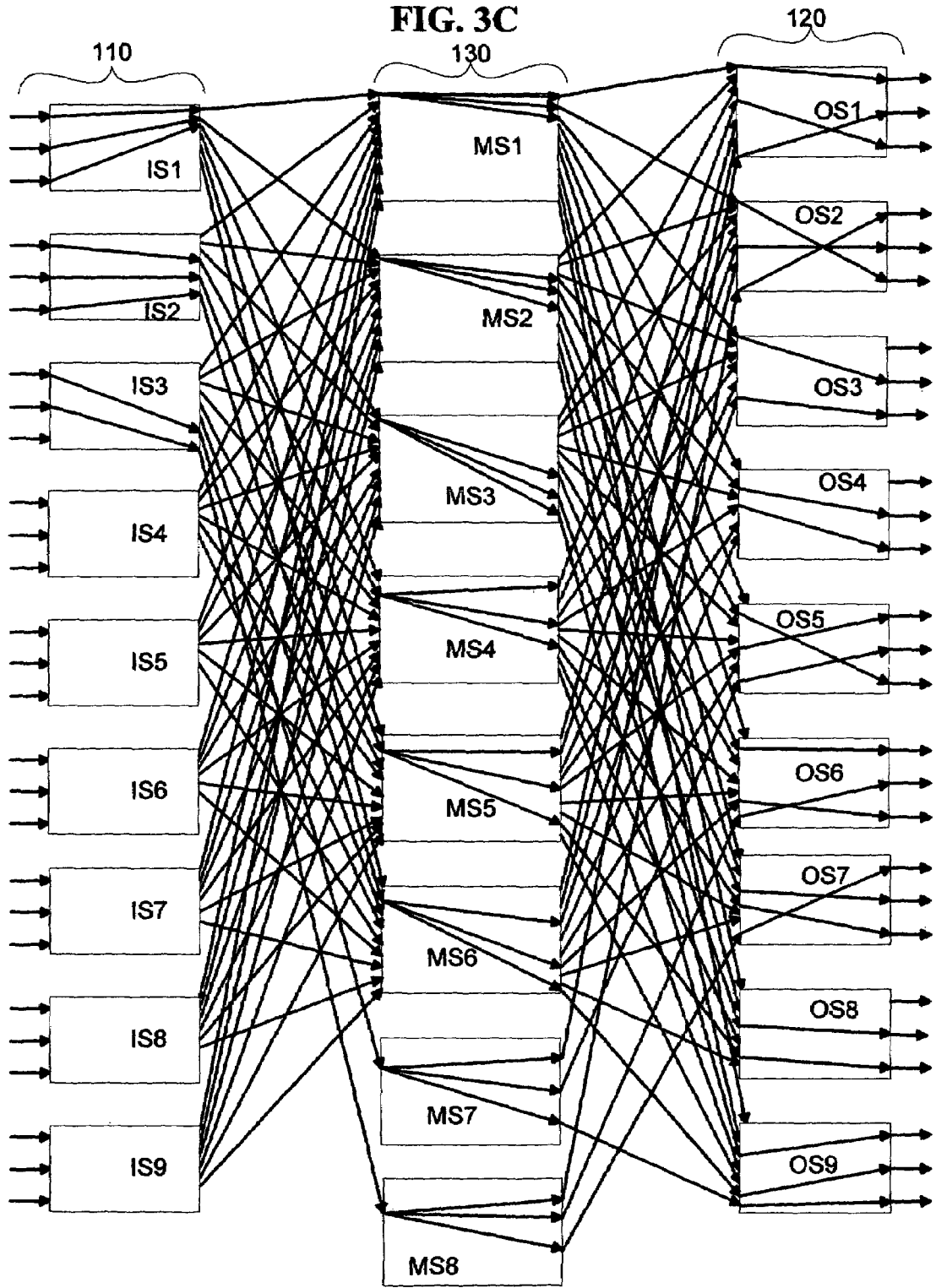
FIG. 3C shows the network of FIG. 3B after a new connection is set up by selecting one middle switch in the network, using the method of FIG. 3A in one implementation.
Figure 3D:
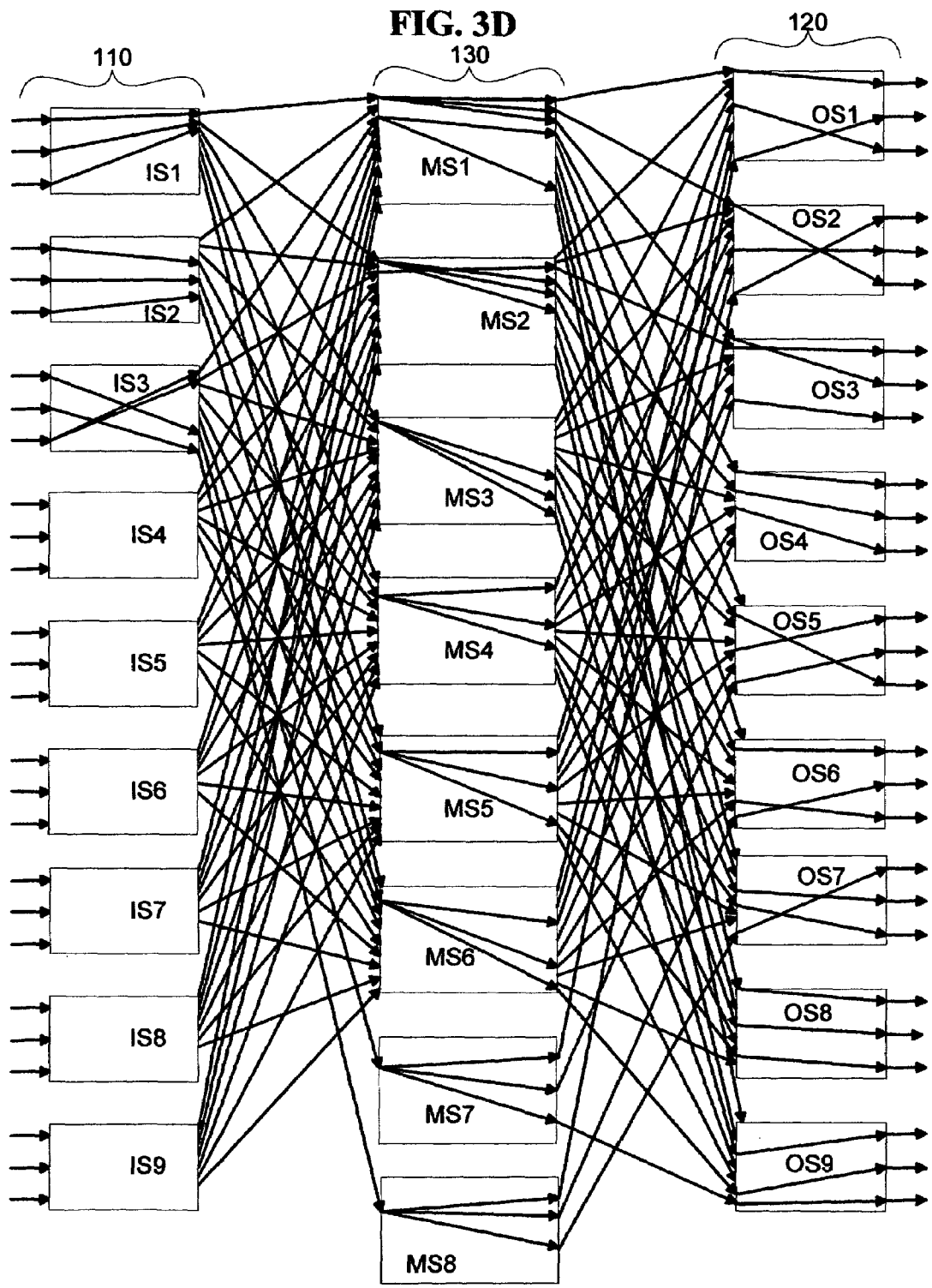
FIG. 3D shows the network of FIG. 3C after another new connection is set up by selecting two middle switches in the network, using the method of FIG. 3A in one implementation.

FIG. 3B shows an initial state of the V(8,3,9) network in which the connections I$_1$-I$_7$ of Table 1 are previously set up. [For the sake of simplicity, FIG. 3B, FIG. 3C, and FIG. 3D do not show in the diagrams the first internal links and second internal links connected to the middle switches MS7 and MS8.] The connections I$_1$, I$_2$, I$_3$, I$_4$, I$_5$, I$_6$, and I$_7$ pass through the middle switches MS1, MS2, MS3, MS4, MS5, MS6, and MS7 respectively. Each of these connections is fanning out only once in the input switch and fanning out three times in each middle switch. Connection I$_1$ from input switch IS1 fans out once into middle switch MS1, and from middle switch MS1 thrice into output switches OS1, OS2, and OS3. Connection I$_2$ from input switch IS1 fans out once into middle switch MS2, and from middle switch MS2 thrice into output switches OS4, OS5, and OS6. Connection I$_3$ from input switch IS1 fans out once into middle switch MS3, and from middle switch MS3 thrice into output switches OS7, OS8, and OS9. Connection $I_4$ from input switch IS2 fans out once into middle switch MS4, and from middle switch MS4 thrice into output switches OS1, OS4, and OS7. Connection $I_5$ from input switch IS2 fans out once into middle switch MS5, and from middle switch MS5 thrice into output switches OS2, OS5, and OS8. Connection $I_6$ from input switch IS2 fans out once into middle switch MS6, and from middle switch MS6 thrice into output switches OS3, OS6, and OS9. Connection $I_7$ from input switch IS3 fans out once into middle switch MS7, and from middle switch MS7 thrice into output switches OS1, OS5, and OS9.

Method 140 of FIG. 3A next sets up a connection $I_8$ from input switch IS3 to output switches OS2, OS6 and OS7 as follows. FIG. 3C shows the state of the network of FIG. 3B after the connection $I_8$ of Table 1 is set up. In act 142A the scheduling method of FIG. 3A finds that only the middle switch MS8 is available to set up the connection $I_8$ (because all other middle switches MS1-MS7 have unavailable second internal links to at least one destination switch), and sets up the connection in act 142C through switch MS8. Therefore, Connection $I_8$ from input switch IS3 fans out only once into middle switch MS8, and from middle switch MS8 three times into output switches OS2, OS6, and OS7 to be connected to all the destinations.

Method 140 next sets up a connection $I_9$ from input switch IS3 to output switches OS3, OS4 and OS8 as follows. FIG. 3D shows the state of the network of FIG. 3C after the connection $I_9$ of Table 1 is set up. The scheduling method of FIG. 3A could not find a single middle switch that has links to all required destinations available to set up the connection. However in act 142B, it finds two middle switches MS1 and MS2 to together have links to all required destinations available for the connection and accordingly the connection $I_9$ is set up in act 142C. And so connection $I_9$ fans out twice in the first switch IS3 into the middle switches MS1 and MS2. Also in the middle switch MS1 it fans out twice into output switches OS4 and OS8, and in the middle switch MS2 it fans out once into output switch OS3 to be connected to all the required destinations.

Figure 4A:
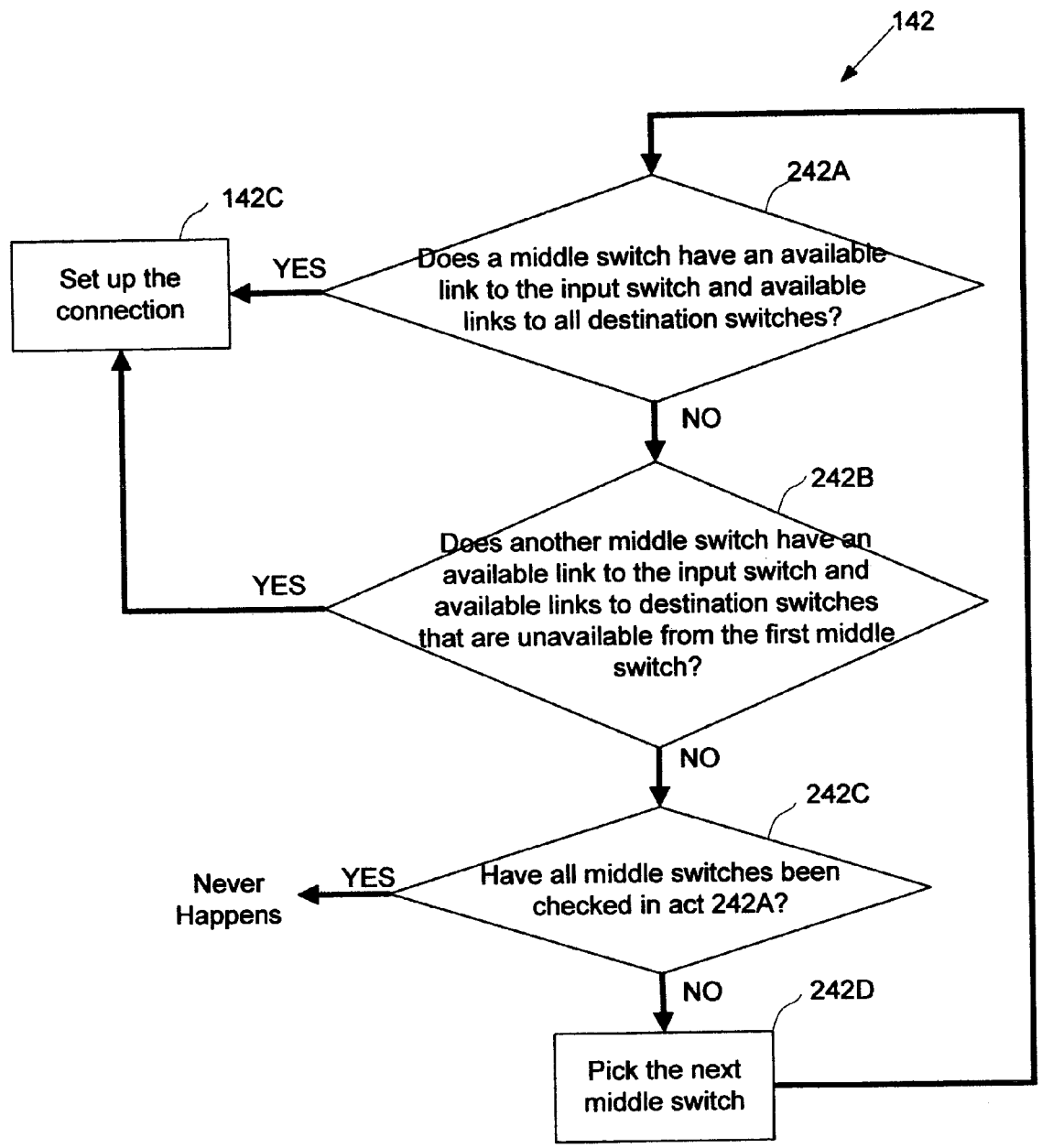
FIG. 4A is another intermediate level flowchart of one implementation of the act 142 of FIG. 3A.
Figure 4B:
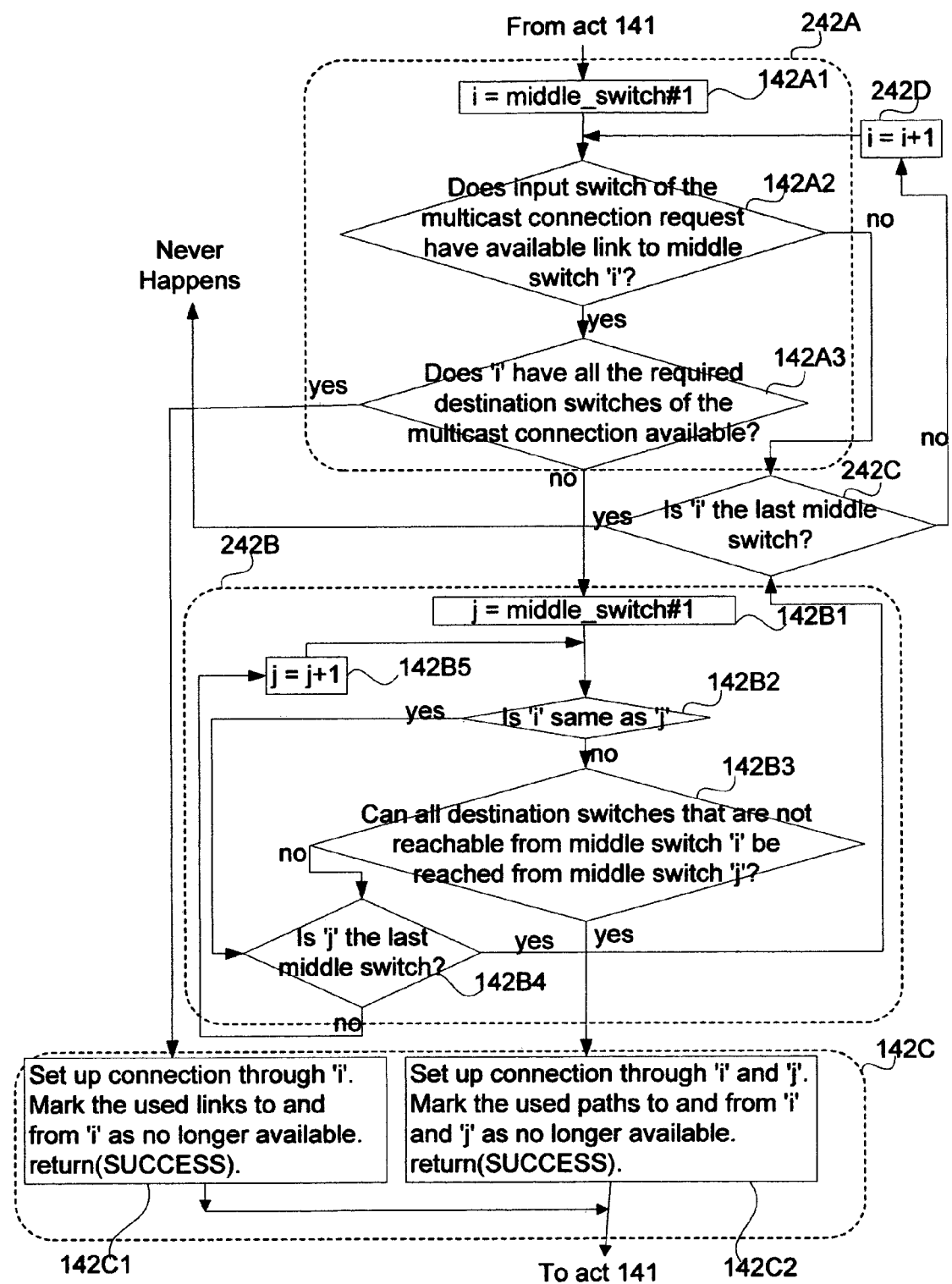
FIG. 4B is low-level flowchart of one variant of act 142 of the method of FIG. 4A.

Act 142 of FIG. 3A is implemented in one embodiment by acts 242A-242D illustrated in FIG. 4A. Specifically, in this embodiment, act 142A is implemented by acts 242A, 242C, and 242D wherein a loop is formed to check if a middle switch has an available link to the input switch, and also has available links to all the required destination switches. In this implementation, the same loop is also used with an additional act 242B to implement act 142B of FIG. 3A. Use of the same loop as illustrated in FIG. 4A provides efficiency by eliminating repetition of the same acts, namely acts 242A, 242C, and 242D that would otherwise have been repeated if act 142B is performed independent of act 142A (FIG. 3A). In act 242B, the method of FIG. 4A checks if another middle switch has available links to destinations that could not be reached by use of the middle switch in act 242A (described above). As illustrated in FIG. 4B, act 242B is reached when the decision in act 242A is "no". In one specific example, acts 242A-242B of FIG. 4B are implemented by use of the information developed in act 242A, for an efficient implementation as discussed next.

FIG. 4B is a low-level flowchart of one variant of act 142 of FIG. 4A. The control to act 142 comes from act 141 after a connection request is received. In act 142A1, an index variable i is set to a first middle switch 1 among the group of middle switches that form stage 130 (FIG. 2B) to initialize an outer loop (formed of acts of 142A2, 142A3, 242B, 242C and 242D) of a doubly nested loop. Act 142A2 checks if the input switch of the connection has an available link to the middle switch i. If not control goes to act 242C. Else if there is an available link to middle switch i, the control goes to act 142A3. Act 142A3 checks if middle switch i has available links to all the destination switches of the multicast connection request. If so the control goes to act 142C1 and the connection is set up through middle switch i. And all the used links from middle switch i to destination output switches are marked as unavailable for future requests. Also the method returns "SUCCESS". Act 242C checks if middle switch i is the last middle switch, but act 242C never results in "yes" which means it always finds at most two middle switches to set up the connection. If act 242C results in "no", the control goes to act 242D from act 242C where i is set to the next middle switch. And the outer loops next iteration starts.

If act 142A3 results in "no" the control goes to act 142B. In act 142B1 another index variable j is set to middle switch 1 to initialize an inner loop (formed of acts 142B2, 142B3, 142B4 and 142B5) of the doubly nested loop. Then the control goes to act 142B2, where the method 140 checks if middle switch j is equal to middle switch i. If middle switch j is equal to middle switch i, the control goes to act 142B4. Else if middle switch j is not equal to middle switch i, the control goes to act 142B3 where the method 140 checks if for all the destinations that have unavailable links from middle switch i have available links from middle switch j. If act 142B3 results in "yes", the connection is set up through middle switch i and middle switch j, in act 142C2. Also all the links used in act 142C2 from middle switch i and middle switch j to destination output switches for setting up the connection are marked as unavailable for future requests and the method returns "SUCCESS". If act 142B3 results in "no", the control goes to act 142B4. In act 142B4, the method 140 checks if middle switch j is last middle switch, and if so the control goes to act 142A4, if not the control goes to act 142B5 where middle switch j is set to the next middle switch. From act 142B5 the control transfers to act 142B2. And thus acts 142B2, 142B3, 142B4 and 142B5 form the inner loop stepping through all the middle switches until two middle switches are found to set up the connection. In a three-stage network of FIG. 2B with $n_1$ inlet links for each of $r_1$ input switches, $n_2$ outlet links for each of $r_2$ output switches, no more than $2*n_1+n_2-1$ middle stage switches are necessary for the network to be strictly nonblocking and hence no more than $2*n_1+n_2-1$ middle stage switches are necessary for the method of FIG. 4A to always find one or two middle switches to set up the connection.

Figure 4C:
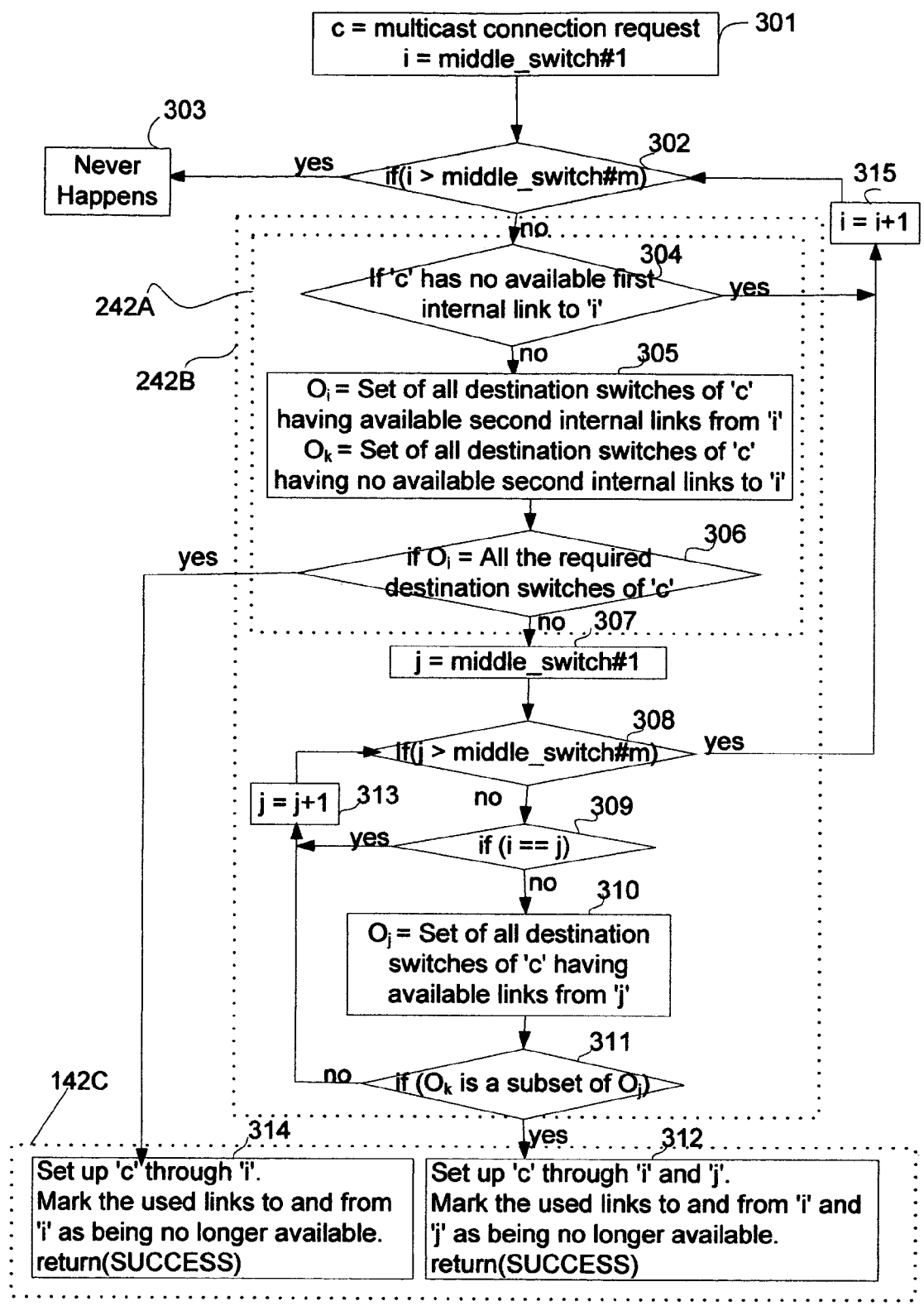
FIG. 4C illustrates, in a flowchart, pseudo code for one example of scheduling method of FIG. 4B.

FIG. 4C illustrates, in a flowchart, a computer implementation of one example of the scheduling method of FIG. 4B. The flowchart FIG. 4C is similar to the flowchart of FIG. 4B excepting for three differences. In FIG. 4C the check for setting up the connection through one middle switch also efficiently implements the half of the check for setting up the connection through two middle switches. The second difference is the loop control code. In the flowchart of FIG. 4B the loop exit test is performed at the end of the inner and outer loops whereas in the flowchart of FIG. 4C the loop exit test is performed at the beginning of the inner loop and outer loops.

And the following method illustrates the psuedo code for one implementation of the scheduling method of FIG. 4C to always set up a new multicast connection request through the network of FIG. 2B, when there are at least $2*n_1+n_2-1$ middle switches in the network as discussed above.

Pseudo Code of the Scheduling Method:

```
Step 1:     c = current connection request;
Step 2:     for i = mid_switch_1 to mid_switch_m do {
Step 3:         if (c has no available link to i) continue;
Step 4:             O_i = Set of all destination switches of c having available links from i ;
Step 5:             O_k = Set of all destination switches of c having no available links from i ;
Step 6:         if (O_i = All the required destination switches of c) {
                    Set up c through i ;
                    Mark all the used paths to and from I as unavailable;
                    return ("SUCCESS");
                }
Step 7:         for j = mid_switch_1 to mid_switch_m do {
Step 8:             if (i = j) {
                        continue;
Step 9:             } else {
                        O_j = Set of all destination switches of c having available links
                              from j ;
Step 10:                if (O_k ⊆ O_j) {
                            Set up c through i and j;
                            Mark all the used paths to and from i and j as unavailable;
                            return ("SUCCESS");
                        }
                    }
                }
            }
Step 11: return("Never Happens");
```

Step 1 above labels the current connection request as "c". Step 2 starts an outer loop of a doubly nested loop and steps through all the middle switches. If the input switch of c has no available link to the middle switch i, next middle switch is selected to be i in the Step 3. Steps 4 and 5 determine the set of destination switches of c having and not having available links from middle switch i, respectively. In Step 6 if middle switch i have available links to all the destination switches of connection request c, connection request c is set up through middle switch i. And all the used links of middle switch i to output switches are marked as unavailable for future requests. Also the method returns "SUCCESS". Step 7 starts the inner loop to step through all the middle switches to search for the second middle switch, and if middle switch i is same as the middle switch j, Step 8 continues to select the next middle switch to be j. Step 9 determines the set of all destination switches having available links from middle switch j. And in Step 10, if all the links that are unavailable from middle switch i are available from middle switch j, connection request c is set up through middle switch i and middle switch j. All the used links from middle switch i and middle switch j to output switches are marked as unavailable and the method returns "SUCCESS". These steps are repeated for all the pairs of middle switches. One or two middle switches can always be found through which c can be set up, and so the control will never reach Step 11. It is easy to observe that the number of steps performed by the scheduling method is proportional to $m^2$, where m is the number of middle switches in the network and hence the scheduling method is of time complexity $O(m^2)$.

Table 2 shows how the steps 1-11 of the above pseudo code implement the flowchart of the method illustrated in FIG. 4C, in one particular implementation.

TABLE 2

| Steps of the pseudo code of the scheduling method | Acts of Flowchart of FIG. 4C |
|---|---|
| 1 | 301 |
| 2 | 301, 302, 315 |
| 3 | 304 |
| 4, 5 | 305 |
| 6 | 306, 314 |
| 7 | 307, 308, 313 |
| 8 | 309 |
| 9 | 310 |
| 10 | 311, 312 |
| 11 | 303 |

Figure 4D:
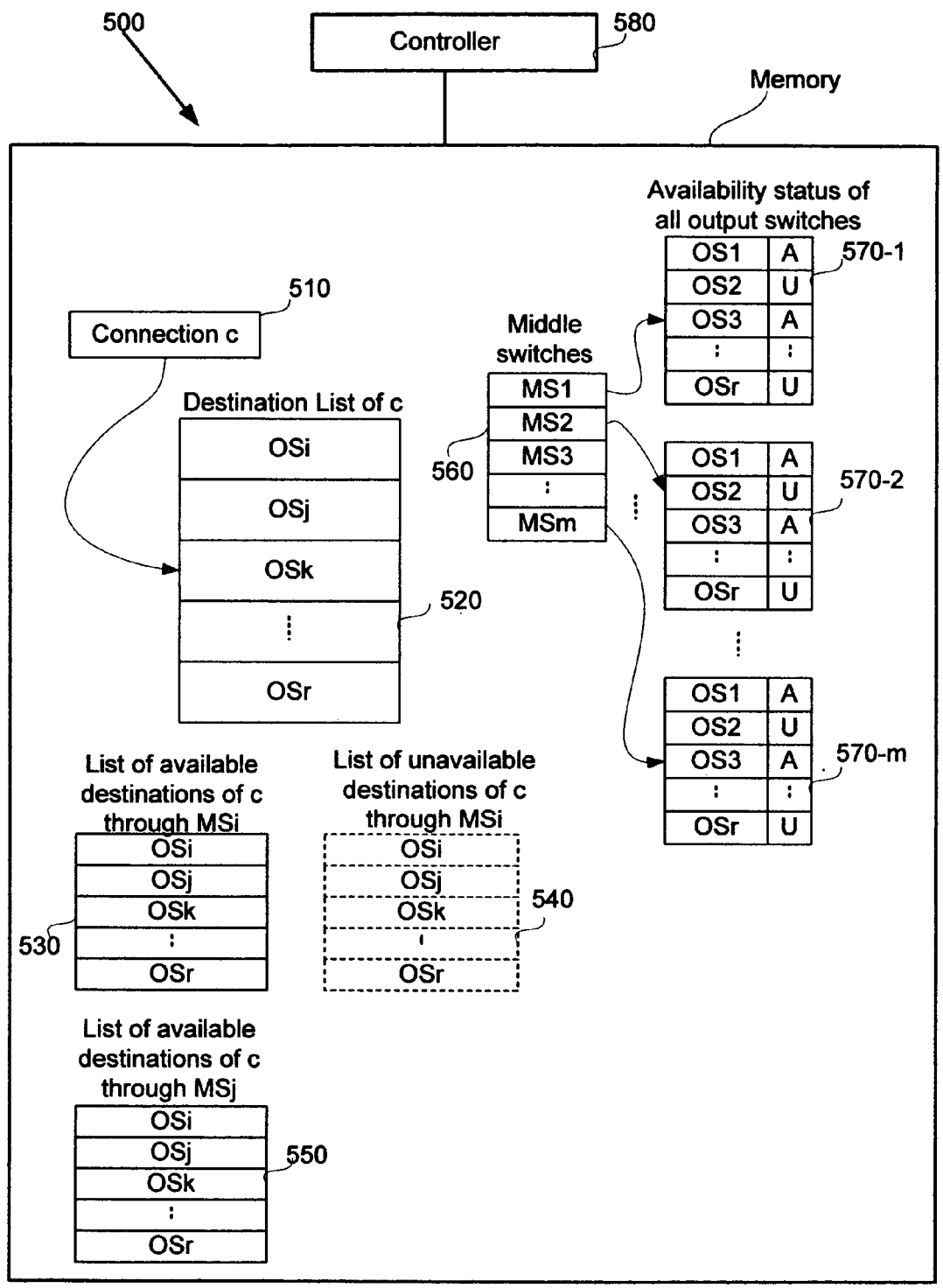
FIG. 4D implements, in one embodiment, the data structures used to store and retrieve data from memory of a controller that implements the method of FIG. 4C.

FIG. 4D illustrates, in one embodiment, the data structures used to store and retrieve data from memory of a controller that implements the method of FIG. 4C. In this embodiment, the fan-out of at most two in the input switch of each connection is implemented by use of two data structures (such as arrays or linked lists) to indicate the destinations that can be reached from each of two middle switches. Specifically as illustrated in FIG. 4D, two arrays 530 and 550 are determined for each of the two middle switches MSi and MSj that are checked for possible use in setting up the connection, for example in act 142 of the scheduling method 140 of FIG. 1B. Arrays 530 and 550 are determined as follows. Each connection request 510 is specified by an array 520 of destination switch identifiers (and also an inlet link of an input switch identifier). Another array 560 of middle switches contains m elements one each for all the middle switches of the network. Each element of array 560 has a pointer to one of m arrays, 570-1 to 570-m, containing a bit that indicates availability status (hereinafter availability status bit) for each output switch OS1-OSr as shown in FIG. 4D. If second internal link to an output switch is available from a middle switch, the corresponding bit in the availability status array is set to 'A' (to denote available, i.e. unused link) as shown in FIG. 4D. Otherwise the corresponding bit is set to 'U' (to denote unavailable, i.e. unused link).

For each connection 510 each pair of middle switches MSi, and MSj are checked to see if all the destinations of connection 510 are reachable from the pair. Specifically this condition is checked by using the availability status arrays 570-i, 570-j of two middle switches MSi and MSj, to determine the available destinations of the connection 510 from MSi and MSj in the respective arrays 530 and 550. In one implementation, each destination is checked if it is available from any one of the middle switches MSi and MSj, and if both the middle switches MSi and MSj do not have availability for a particular destination, this particular pair of middle switches MSi and MSj cannot be used to set up the connection. However if middle switches MSi and MSj are determined to have unavailability of a particular destination, a different pair of middle switches are checked for example the middle switches MSi and MSk. In this implementation, middle switches MSi and MSk are checked for the availability of all the destinations of the connection 510 in the same manner as middle switches MSi and MSj. Therefore in this implementation, there is no need to use an additional array 540 of unavailable destinations from middle switch MSi (as discussed next).

An alternative implementation saves (see act 305 of FIG. 4C) an array 540 (see FIG. 4D) of unavailable destinations from middle switch MSi, at the time middle switch MSi is first paired with a middle switch, (e.g. MSj) other than itself when attempting to satisfy the connection request 510. Such saving of array 540 eliminates the need for each destination of the connection request 510 to be checked for middle switch MSi, when middle switch MSi is paired with another middle switch (e.g. MSk). If the array 540 of unavailable destinations from MSi is saved once, only these destinations (in array 540) need to be checked for availability in middle switch MSk, which improves the speed of the computation. The embodiment of FIG. 4D can be implemented to set up connections in a controller 580 and memory 500 (described above in reference to FIG. 1A, FIG. 2A, and FIG. 2B etc.).

In rearrangeably nonblocking networks, the switch hardware cost is reduced at the expense of increasing the time required to set up connection a connection. The set up time is increased in a rearrangeably nonblocking network because existing connections that are disrupted to implement rearrangement need to be themselves set up, in addition to the new connection. For this reason, it is desirable to minimize or even eliminate the need for rearrangements to existing connections when setting up a new connection. When the need for rearrangement is eliminated, that network is either wide-sense nonblocking or strictly nonblocking, depending on the number of middle switches and the scheduling method. Embodiments of rearrangeably nonblocking networks using 2*n or more middle switches are described in the related U.S. patent application, Ser. No. 09/967,815 that is incorporated by reference above.

In strictly nonblocking multicast networks, for any request to form a multicast connection from an inlet link to some set of outlet links, it is always possible to find a path through the network to satisfy the request without disturbing any existing multicast connections, and if more than one such path is available, any of them can be selected without being concerned about realization of future potential multicast connection requests. In wide-sense nonblocking multicast networks, it is again always possible to provide a connection path through the network to satisfy the request without disturbing other existing multicast connections, but in this case the path used to satisfy the connection request must be selected to maintain nonblocking connecting capability for future multicast connection requests. In strictly nonblocking networks and in wide-sense nonblocking networks, the switch hardware cost is increased but the time required to set up connections is reduced compared to rearrangeably nonblocking networks. The foregoing discussion relates to embodiments of strictly nonblocking networks where the connection set up time is reduced.

To provide the proof for the current invention, first the proof for the rearrangeably nonblocking behavior of symmetric networks V(m,n,r) of the invention is presented. (Proof for rearrangeably nonblocking networks using 2*n or more middle switches is described in the related U.S. Pat. No. 6,868,084 that is incorporated by reference above.) Later it will be extended for asymmetric networks V(m,$n_1$, $r_1$,$n_2$,$r_2$). When m>=2*n, the V(m,n,r) Clos network is operated in rearrangeably nonblocking manner for multicast connections if the following scheduling criterion is met: Every connection request is fanned out at most twice in the input switch; Alternatively every connection request is set up through at most two middle switches.

Since when m>=2*n-1, the V(m,n,r) network is strictly nonblocking for unicast assignments, it means for unicast assignments, applicant notes that there always exists an available link through at least one middle switch from any arbitrary input switch to any arbitrary output switch. Alternatively, if there exists available links from an arbitrary input switch to a number of middle switches at least one of these middle switches has an available link to any arbitrary output switch. It also means when m>=2*n-1, from any arbitrary input switch if there exists available links to a number of middle switches, all output switches have available links from at least one of those middle switches.

To prove that the network is rearrangeably nonblocking for multicast assignments, applicant notes that it is necessary and sufficient to prove the following two conditions: 1) There are enough middle switches to fan out each connection at most twice in the input switch; 2) From an arbitrary input switch, there always exist at least two middle switches with available links between these two middle switches and the input switch such that there are available links to all the destination output switches, of any connection request (e.g. All output switches in case of a broadcast connection request), from these two middle switches.

To prove the condition 1, applicant observes that there are enough middle switches if each connection is fanned out at most twice since m>=2*n. Moreover applicant provides proof for the condition 2 by contradiction as follows. In the worst-case scenario, suppose all the r output switches have (n−1) outlet links already connected. Now suppose from the given input switch all the output switches have to be reached for the nth outlet link.

Suppose there are not at least two middle switches available through which there are available links from the given input switch to all the output switches. If it happens, then each of the middle switches will have $$\left(\frac{r}{2}+1\right)$$

second internal links already in use. i.e., total second internal links used in all the middle switches is given by, $$\left(\frac{r}{2}+1\right)*(2*n)=n*r+2*n$$

Which is not possible because the maximum possible second internal links in use is n*r.

So there always exist at least two middle switches through which there are paths from any given input switch to all the output switches. Since the number of middle switches m=2*n is sufficient to set up the multicast connections, the V(m,n,r) Clos network can be operated in rearrangeably nonblocking manner. Hence, if m>=2*n, the V(m,n,r) Clos network can be operated in rearrangeably nonblocking manner for multicast connections of any arbitrary fan-out.

Now the proof that the V(m,n,r) network is strictly nonblocking for multicast assignments when m=3*n−1 is presented. Compared to strictly nonblocking unicast algorithm, in the above provided proof for rearrangeably nonblocking where m>=2*n applicant notes that for realizing a multicast connection from each inlet link in an input switch, one additional potential first internal link is taken away from the rest of the inlet links from the same input switch and hence with an additional n−1 middle switches, one each for the first n−1 inlet links, the V(m,n,r) network is strictly nonblocking for multicast assignments.

To extend the proof (described above), applicant now shows that $V(m,n_1,r_1,n_2,r_2)$ network can be operated in rearrangeably nonblocking manner for multicast connections when m>=$n_1$+$n_2$, by considering the two cases $n_1$<$n_2$ and $n_1$>$n_2$.

1) $n_1$<$n_2$: In this case, the number of middle switches necessary is 2*$n_1$ which is <($n_1$+$n_2$). To prove the sufficiency, even though there are a total of $n_2$*$r_2$ outlet links in the network, in the worst-case scenario only $n_1$*$r_2$ second internal links will be needed. This is because, even if all $n_2$*$r_2$ outlet links are destinations of the connections, using the fan-out capability in the output switches the rearrangeably nonblocking behavior can be realized. And so 2*$n_1$ which is <($n_1$+$n_2$) middle switches is sufficient.

2) $n_1$>$n_2$: In this case, since there are a total of $n_2$*$r_2$ outlet links in the network, only a maximum of $n_2$*$r_2$ second internal links will be used even if all the $n_2$*$r_2$ outlet links are destinations of the network connections. When the number of middle switches is $n_1$+$n_2$ the total second internal links in the network is given by $r_2$*($n_1$+$n_2$) which is more than the required number, according to the rearrangeability proof for V(m,n,r) as shown earlier, which is $r_2$*(2*$n_2$). Also from any input switch only a maximum of $n_2$ out of $n_1$ available inlet links can each have fan-out of $r_2$. And so only a maximum of $n_2$ connections from any input switch need to be fanned out into two. And so $n_1$+$n_2$ middle switches are sufficient.

The extension of the proof when m>=2*$n_1$+$n_2$−1 that $V(m,n_1,r_1,n_2,r_2)$ network is operated in strictly nonblocking manner, is similar to that of V(m,n,r) network.

TABLE 3

A multicast assignment in a V(14, 5, 25)Network

| Requests for r = 1 | Requests for r = 2 | Requests for r = 3 |
|---|---|---|
| $I_1$ = {1, 2, 3, 4, 5}, | $I_6$ = {1, 6, 11, 16, 21}, | $I_{11}$ = {1, 7, 13, 19, 25}, |
| $I_2$ = {6, 7, 8, 9, 10}, | $I_7$ = {2, 7, 12, 17, 22}, | $I_{12}$ = {2, 8, 14, 20, 21}, |
| $I_3$ = {11, 12, 13, 14, 15}, | $I_8$ = {3, 8, 13, 18, 23}, | $I_{13}$ = {3, 9, 15, 16, 22}, |
| $I_4$ = {16, 17, 18, 19, 20}, | $I_9$ = {4, 9, 14, 19, 24}, | $I_{14}$ = {4, 10, 11, 17, 23}, |
| $I_5$ = {21, 22, 23, 24, 25}, | $I_{10}$ = {5, 10, 15, 20, 25}, | $I_{15}$ = {5, 6, 12, 18, 24}, |

| Requests for r = 4 | Requests for r = 5 |
|---|---|
| $I_{16}$ = {1, 8, 15, 17, 24}, | $I_{21}$ = {1, 9, 12, 20, 23}, |
| $I_{17}$ = {2, 9, 11, 18, 25}, | $I_{22}$ = {2, 10, 13, 16, 24}, |
| $I_{18}$ = {3, 10, 12, 19, 21}, | $I_{23}$ = {3, 6, 14, 17, 25}, |
| $I_{19}$ = {4, 6, 13, 20, 22}, | $I_{24}$ = {4, 7, 15, 18, 21}, |
| $I_{20}$ = {5, 7, 14, 16, 23}, | $I_{25}$ = {5, 8, 11, 19, 22} |

Table 3 shows an exemplary multicast assignment in a V(10,5,25) network. Each request has a fan-out of five. All the outlet links are connected in this multicast assignment since each output switch is used exactly five times in the requests corresponding to five outlet links of each output switch. In one implementation, Table 4 shows by using only m=3*n−1=14 middle switches, the multicast assignment can be set up to operate the network in strictly nonblocking manner.

TABLE 4

A strictly nonblocking Schedule of the Multicast assignment of Table 3

| | M = 1 | M = 2 | M = 3 | M = 4 | M = 5 | M = 6 | M = 7 |
|---|---|---|---|---|---|---|---|
| R = 1 | 1, 2 | 3, 4, 5 | 6, 7 | 8, 9, 10 | 11, 12 | 13, 14, 15 | 16, 17 |
| R = 2 | 6, 11, 16, 21 | 1 | 2, 12, 17, 22 | 7 | 3, 8, 13, 18, 23 | 4, 9, 19, 24 | 14 |
| R = 3 | 7, 13, 19, 25 | 2, 8, 14, 20, 21 | 1 | 3, 15, 16, 22 | 9 | 10, 11, 17, 23 | 4 |
| R = 4 | 8, 15, 17, 24 | 9, 11, 18, 25 | 3, 10, 19, 21 | 1 | 2 | 12 | 6, 13, 20, 22 |
| R = 5 | 9, 12, 20, 23 | 10, 13, 16, 24 | 14, 25 | 2 | 1 | 7, 18, 21 | 5, 8, 11, 19 |

| | M = 8 | M = 9 | M = 10 | M = 11 | M = 12 | M = 13 | M = 14 |
|---|---|---|---|---|---|---|---|
| R = 1 | 18, 19, 20 | 21, 22 | 23, 24, 25 | | | | |
| R = 2 | 5, 10, 15, 25 | 20 | | | | | |
| R = 3 | 6, 12, 24 | 5, 18 | | | | | |
| R = 4 | 4 | 7, 14, 16, 23 | 5 | | | | |
| R = 5 | 22 | 3, 6, 17 | 4, 15 | | | | |

Each row in Table 4 represents an input switch and each column represents a middle switch. And each element in the table represents the list of output switches set up through the corresponding middle switch for a connection originating from the corresponding input switch. The correspondence between different connections from the same row of Table 4 and hence from the same input switch can be obtained from the multicast assignment of the Table 3.

Figure 5A:
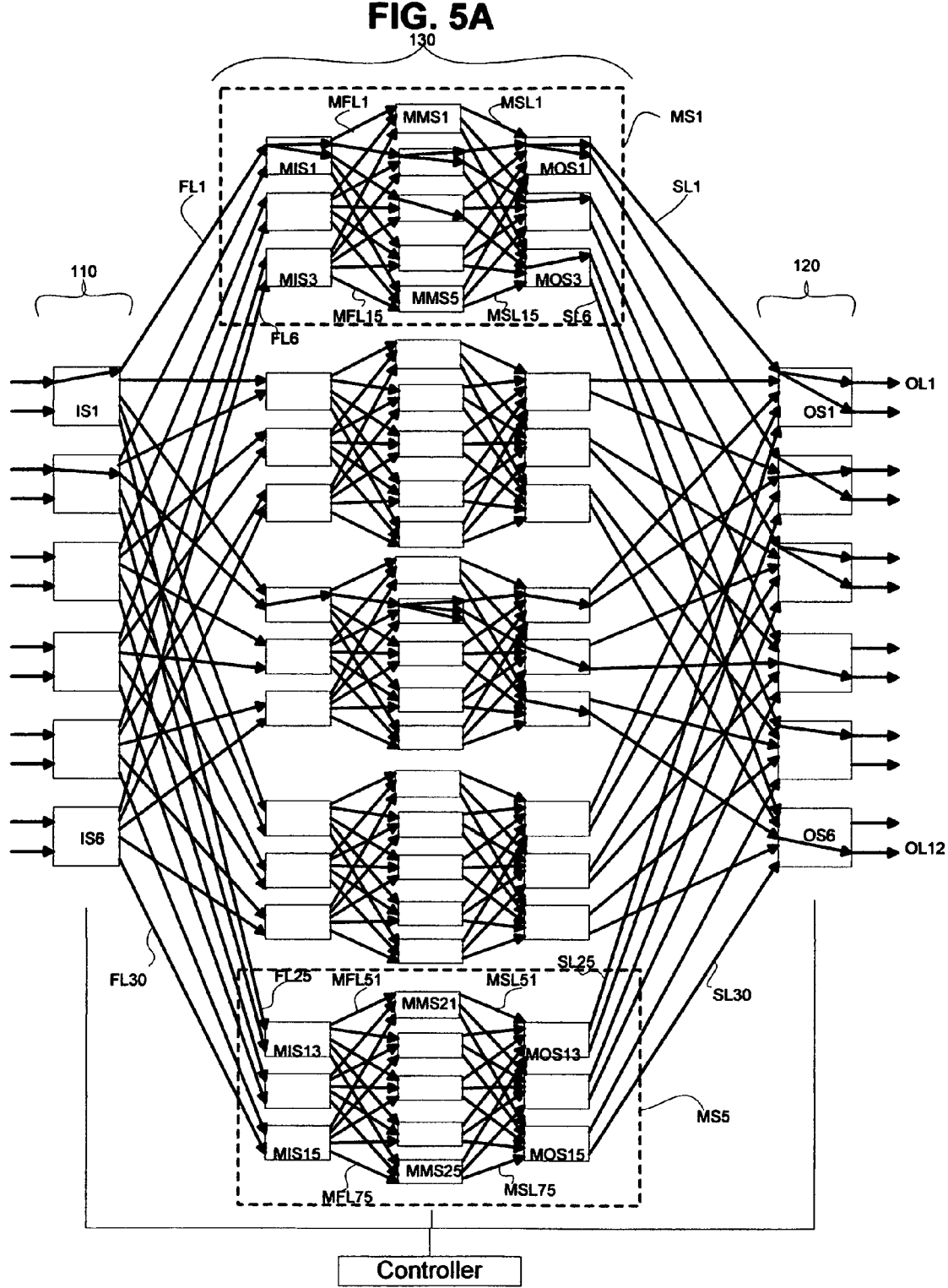
FIG. 5A is a diagram of an exemplary three-stage network where the middle stage switches are each three-stage networks.

Referring to FIG. 5A a five stage strictly nonblocking network is shown according to an embodiment of the present invention that uses recursion as follows. The five stage network comprises input stage 110 and output stage 120, with inlet links IL1-IL12 and outlet links OL1-OL12 respectively, where input stage 110 consist of six, two by five switches IS1-IS6, and output stage 120 consist of six, five by two switches OS1-OS6. However, unlike the single switches of middle stage 130 of the three-stage network of FIG. 1A, the middle stage 130 of FIG. 5A consists of five, six by six three-stage subnetworks MS1-MS5 (wherein the term "subnetwork" has the same meaning as the term "network"). Each of the five middle switches MS1-MS5 are connected to each of the input switches through six first internal links (for example the links FL1-FL6 connected to the middle switch MS1 from each of the input switch IS1-IS6), and connected to each of the output switches through six second internal links (for example the links SL1-SL6 connected from the middle switch MS1 to each of the output switch OS1-OS6). In one embodiment, the network also includes a controller coupled with the input stage 110, output stage 120 and middle stage subnetworks 130 to form connections between an inlet links IL1-IL12 and an arbitrary number of outlet links OL1-OL12.

Each of middle switches MS1-MS5 is a V(5,2,3) three-stage subnetwork. For example, the three-stage subnetwork MS1 comprises input stage of three, two by five switches MIS1-MIS3 with inlet links FL1-FL6, and an output stage of three, five by two switches MOS1-MOS3 with outlet links SL1-SL6. The middle stage of MS1 consists of five, three by three switches MMS1-MMS5. Each of the middle switches MMS1-MMS5 are connected to each of the input switches MIS1-MIS3 through three first internal links (for example the links MFL1-MFL3 connected to the middle switch MMS1 from each of the input switch MIS1-MIS3), and connected to each of the output switches MOS1-MOS3 through three second internal links (for example the links MSL1-MSL3 connected from the middle switch MMS1 to each of the output switch MOS1-MOS3). In similar fashion the number of stages can increase to 7, 9, etc.

As with the three-stage network, the network of FIG. 5A has the property of being operable in strictly nonblocking manner as described herein with no more than 3*n−1 middle stage three-stage networks. In the network of FIG. 5A the middle stage requires no more than 3*n−1 three-stage subnetworks. Thus in FIG. 5A where n equals 2, middle stage 130 has five middle stage three-stage subnetworks MS1-MS5. Furthermore, according to the present invention, each of the middle stage subnetworks MS1-MS5 require no more than $2*k_1+k_2-1$ middle switches MMS1-MMS5, where $k_1$ is the number of inlet links for each middle input switch MIS1-MIS3 and $k_2$ is the number of outlet links for each middle output switch MOS1-MOS3.

In general, according to certain embodiments, one or more of the switches, in any of the first, middle and last stages can be recursively replaced by a three-stage subnetwork with no more than $2*n_1+n_2-1$ middle stage switches where $n_1$ is the number of inlet links to the first stage switch in the subnetwork and $n_2$ is the number of outlet links to the last stage switch of the subnetwork for strictly nonblocking operation, for multicast connections of arbitrary fan-out. Note that because the term "subnetwork" has the same meaning as "network", the just described replacement can be repeated recursively, as often as desired, depending on the embodiment.

It should be understood that the methods, discussed so far, are applicable to k-stage networks for k>3 by recursively using the design criteria developed on any of the switches in the network. The presentation of the methods in terms of three-stage networks is only for notational convenience. That is, these methods can be generalized by recursively replacing each of a subset of switches (at least 1) in the network with a smaller three-stage network, which has the same number of total inlet links and total outlet links as the switch being replaced. For instance, in a three-stage network, one or more switches in either the input, middle or output stages can be replaced with a three-stage network to expand the network. If, for example, a five-stage network is desired, then all middle switches (or all input switches or all output switches) are replaced with a three-stage network In accordance with the invention, in any of the recursive three-stage networks each connection can fan out in the first stage switch into at most two middle stage subnetworks, and in the middle switches and last stage switches it can fan out any arbitrary number of times as required by the connection request. For example as shown in the network of FIG. 5A, connection $I_1$ fans out in the first stage switch IS1 once into middle stage subnetwork MS1. In middle stage subnetwork MS1 it fans out four times into output switches OS1, OS2, OS3 and OS5. In output switches OS1 and OS3 it fans out twice. Specifically from output switch OS1 into outlet links OL1, OL2, and from output switch OS3 into outlet links OL5, OL6. In output switches OS2 and OS5 it fans out once into outlet links OS4 and OS9 respectively. However in the three-stage network MS1, it can fan out at most twice in the first stage, for example connection $I_1$ fans out twice in the input switch MIS1 into middle switches MMS2 and MMS3 of the three-stage subnetwork MS1. Similarly a connection can fan out arbitrary number of times in the middle and last stages of any three-stage subnetwork. For example connection $I_1$ fans out twice in middle switch MMS2 into output switches MOS1 and MOS2 of three-stage subnetwork MS1. In the output switch MOS1 of three-stage subnetwork MS1 it fans out twice into output switches OS1 and OS2. And in the output switch MOS2 of three-stage subnetwork MS1 it fans out once into output switch OS3. Also the connection $I_1$ fans out in middle switch MMS3 once into output switch MOS2 of the three-stage subnetwork MS1 and from there once into output switch OS5.

The connection $I_3$ fans out once into three-stage subnetwork MS3 where it is fanned out three times into output switches OS2, OS4, and OS6. In output switches OS2, OS4, and OS6 it fans out once into outlet links OL3, OL8, and OL12 respectively. The connection $I_3$ fans out once in the input switch MIS7 of three-stage subnetwork MS3 into middle switch MMS12 of three-stage subnetwork MS3 where it fans out three times into output switches MOS7, MOS8, and MOS9 of the three-stage subnetwork MS3. In each of the three output switches MOS7, MOS8 and MOS9 of the three-stage subnetwork MS3 it fans out once output switches OS2, OS4, and OS6 respectively.

Figure 5B:
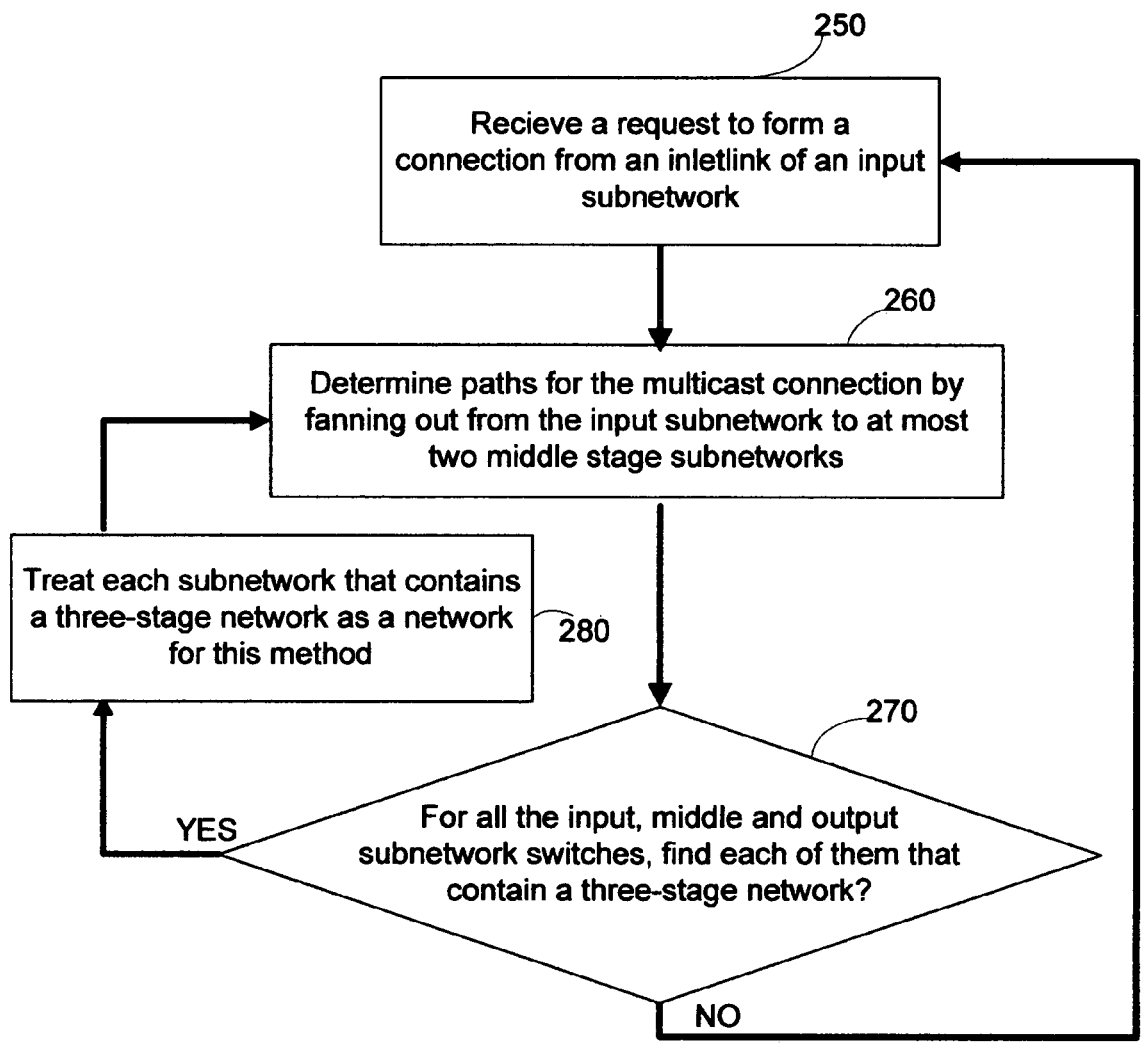
FIG. 5B is high-level flowchart, in one embodiment, of a recursively scheduling method in a recursively large multi-stage network such as the network in FIG. 5A.

FIG. 5B shows a high-level flowchart of a rearrangeable scheduling method, in one embodiment executed by the controller of FIG. 5A. The method of FIG. 5B is used only for networks that have three stages each of which may be in turn composed of three-stage subnetworks, in a recursive manner as described above in reference to FIG. 5A. According to this embodiment, a multicast connection request is received in act 250 (FIG. 5B). Then a connection to satisfy the request is set up in act 260 by fanning out into at most two middle stage subnetworks from its input switch. Then the control goes to act 270. Act 270 recursively goes through each subnetwork contained in the network. For each subnetwork found in act 270 the control goes to act 280 and each subnetwork is treated as a network and the scheduling is performed similarly. Once all the recursive subnetworks are scheduled the control transfers from act 270 to act 250 so that each multicast connection will be scheduled in the same manner in a loop.

Figure 6A:
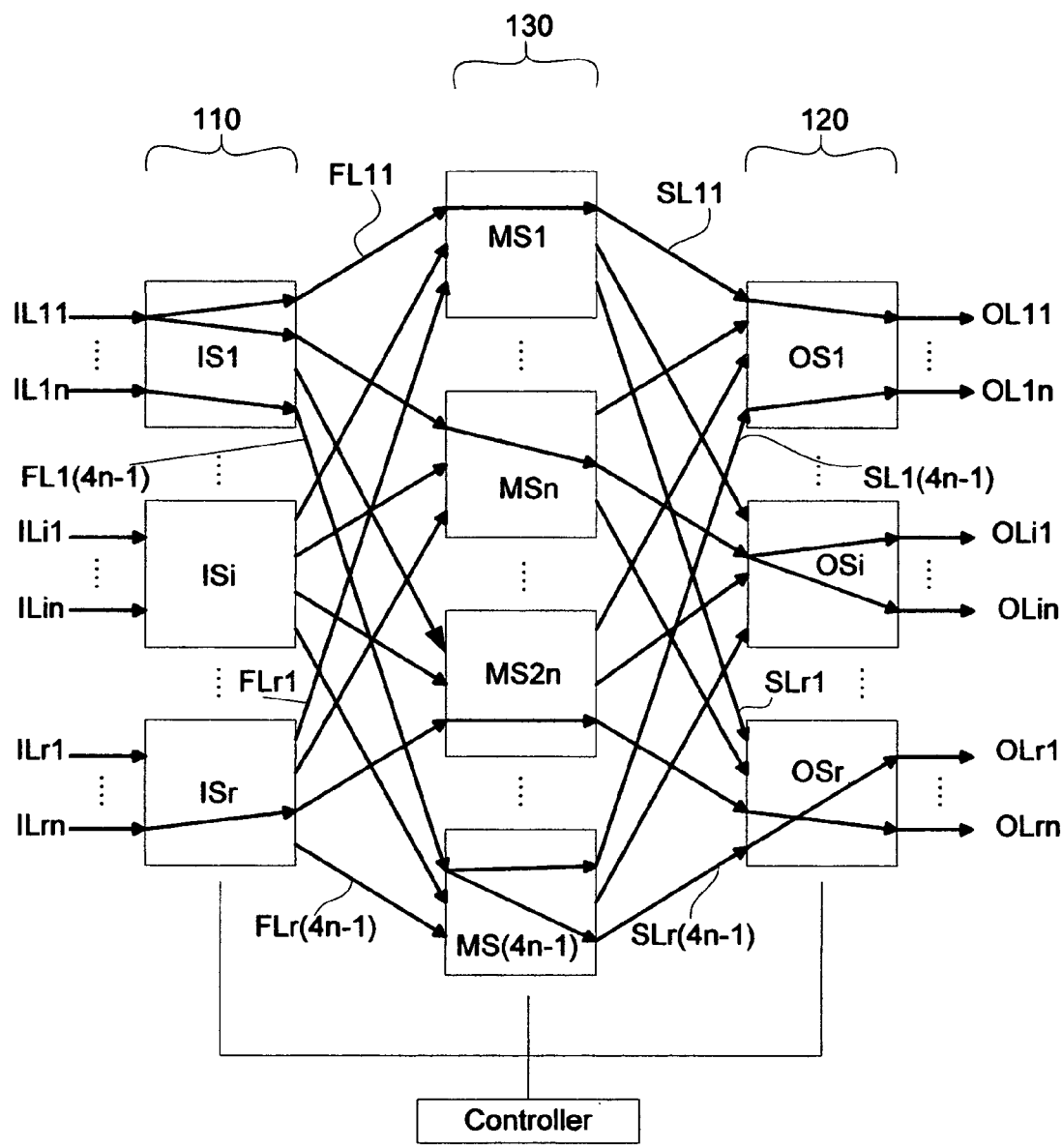
FIG. 6A is a diagram of a general symmetrical three-stage network with n inlet links in each of r input stage switches and $m=4*n-1$ middle stage switches.
Figure 6B:
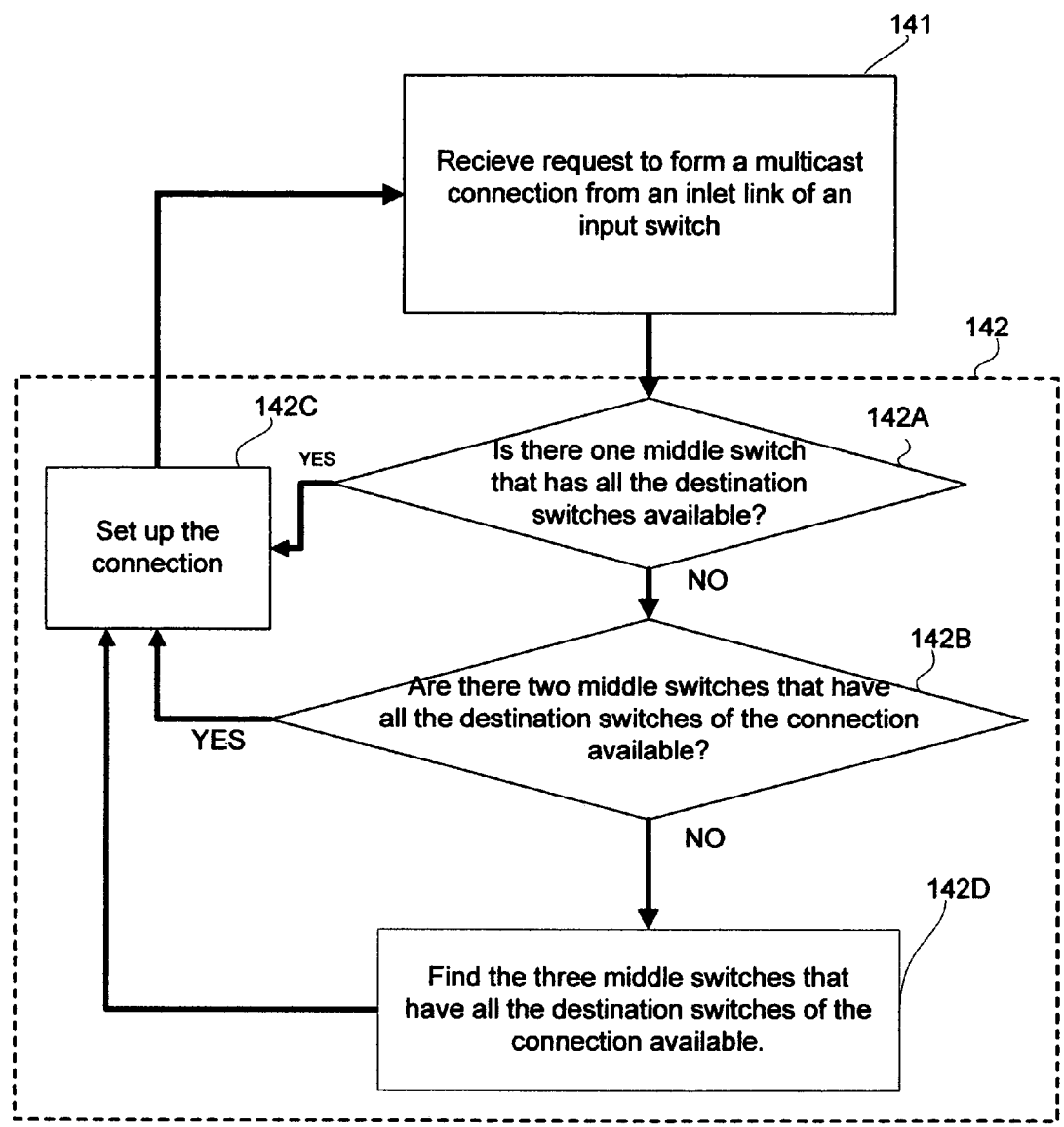
FIG. 6B is high-level flowchart, in one embodiment, of a scheduling method used to set up multicast connections the network of FIG. 6A, according to the invention.

A direct extension of the foregoing discussion is that when the number of middle switches is increased, the above-described methods can be changed to improve speed. For example when m=4*n−1, each multicast connection can be fanned out into at most three middle switches and the V(m,n,r) network can be operated in strictly nonblocking manner. Similarly, when m=3*$n_1$+$n_2$−1, the V(m,$n_1$,$r_1$,$n_2$,$r_2$) network is operated in strictly nonblocking manner if each multicast connection is fanned out into at most three middle switches. FIG. 6A shows a general symmetrical multi-stage network with m=4*n−1 middle switches. Excepting for the middle switches to be m=4*n−1, the description of FIG. 6A is similar to FIG. 2A. FIG. 6B shows the scheduling method by fanning out into at most three middle switches. Excepting for the additional act 142D of testing for three middle switches and setting up a connection through three middle switches in act 142C, the description of the method of FIG. 6B is similar to the method of FIG. 3A.

Figure 7A:
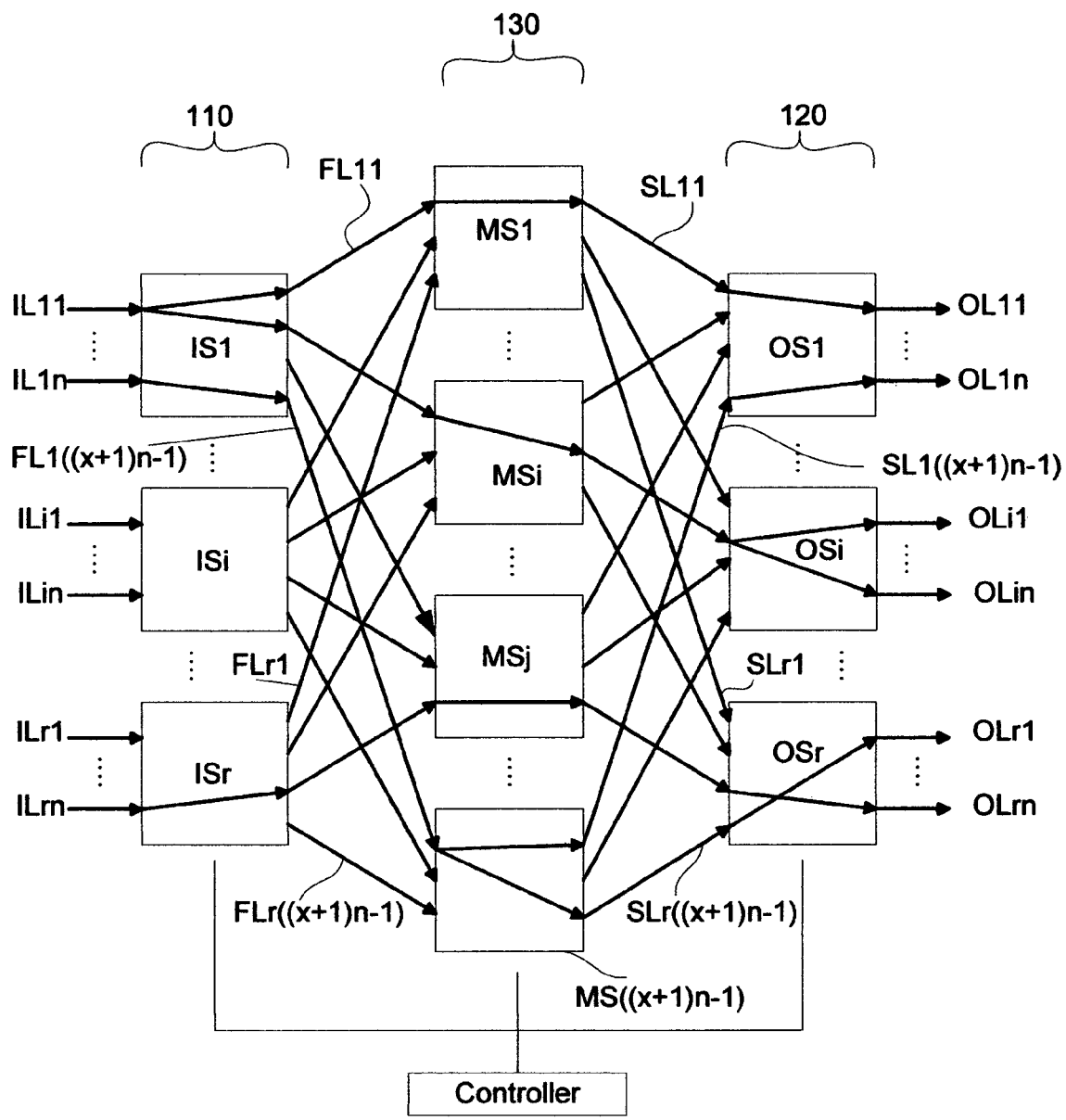
FIG. 7A is a diagram of a general symmetrical three-stage network with n inlet links in each of r input stage switches and $m=x*n$ middle stage switches for $x \geq 2$.
Figure 7B:
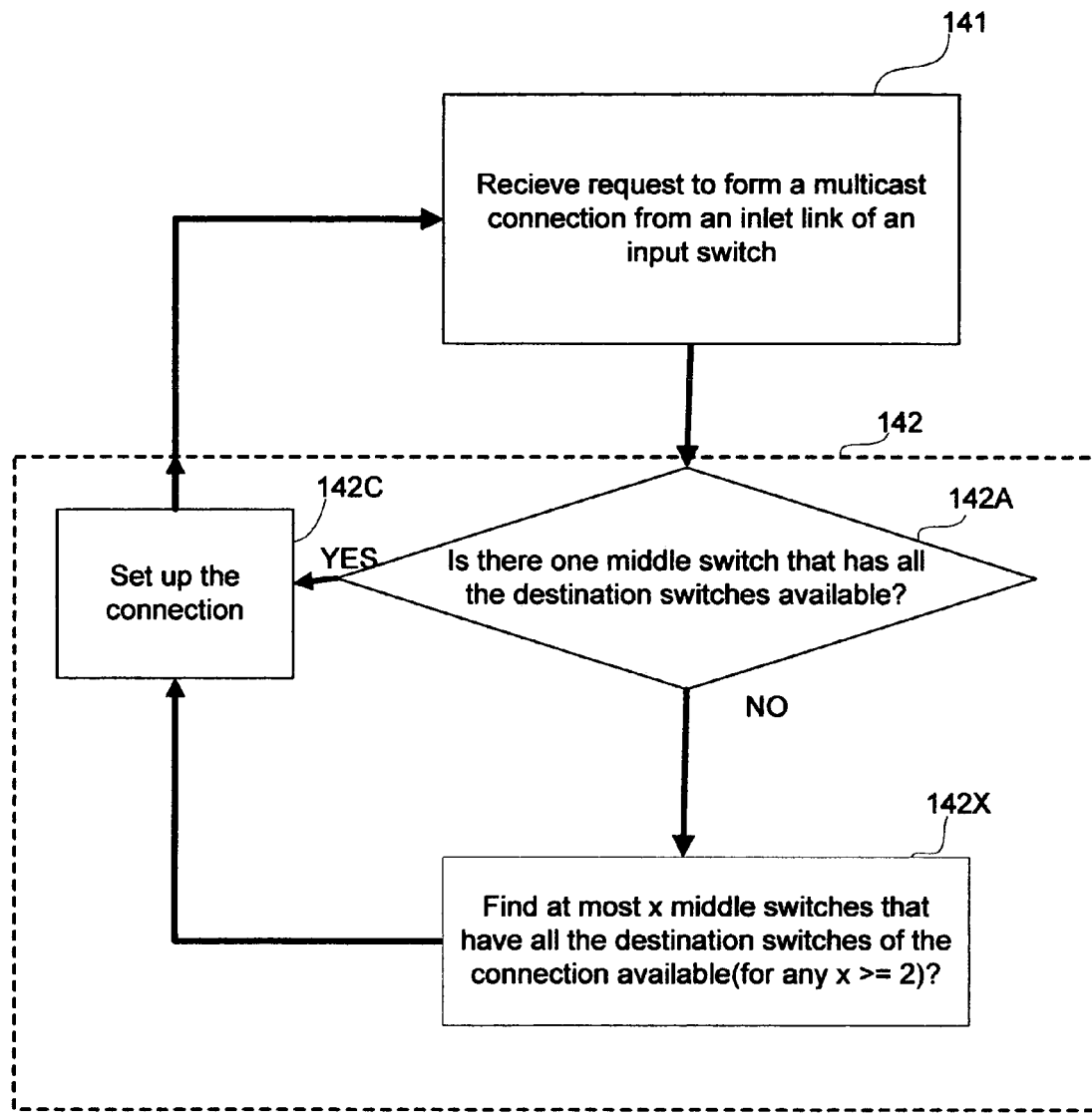
FIG. 7B is high-level flowchart, in one embodiment, of a scheduling method used to set up multicast connections in the network of FIG. 7A, according to the invention.

In general when m=(x+1)*n−1 and x≧2 each multicast connection can be fanned out into at most x middle switches and the V(m,n,r) network is operated in strictly nonblocking manner. Similarly, when m=x*$n_1$+$n_2$−1, the V(m,$n_1$,$r_1$,$n_2$,$r_2$) network is operated in strictly nonblocking manner if each multicast connection is fanned out into at most x middle switches. FIG. 7A shows a general symmetrical multi-stage network with m=(x+1)*n−1 middle switches. Excepting for the middle switches to be m=(x+1)*n−1, the description of FIG. 7A is similar to FIG. 2A. FIG. 7B shows the scheduling method by fanning out into at most x middle switches. Excepting for the additional act 142X of testing for x middle switches and setting up a connection through x middle switches in act 142C, the description of the method of FIG. 7B is similar to the method of FIG. 3A.

In an alternative embodiment, when m≧$x_1$*$a_1$+$x_2$*$a_2$+ . . . +$x_p$*$a_p$+$n_1$−1, where $a_1$+$a_2$+ . . . +$a_p$=$n_1$+$n_2$, the V(m,$n_1$,$r_1$,$n_2$,$r_2$) network is operated in strictly nonblocking manner as described herein, when multicast connections are set up such that connections from $a_i$ inlet links of each input switch pass through at most $x_i$ middle switches for 1≦i≦p.

Numerous modifications and adaptations of the embodiments, implementations, and examples described herein will be apparent to the skilled artisan in view of the disclosure.

For example, in one embodiment a method of the type described above is modified as follows when the number of output switches $r_2$ is less than or equal to four. Specifically, a three-stage network is operated in strictly nonblocking manner when the multicast connection is fanned out only once in the input stage, with m number of middle stage switches where m≧$\lfloor \sqrt{r_2} \rfloor$*MIN($n_1$,$n_2$) when $\lfloor \sqrt{r_2} \rfloor$ is >1 and odd, or when $\lfloor \sqrt{r_2} \rfloor$=2, m≧($\lfloor \sqrt{r_2} \rfloor$−1)*MIN($n_1$,$n_2$) when $\lfloor \sqrt{r_2} \rfloor$ is >2 and even, and m≧$n_1$+$n_2$−1 when $\lfloor \sqrt{r_2} \rfloor$=1. So when $r_2$ is less than or equal to five a three-stage network is operated in strictly nonblocking manner for m≦2*n.

For example, in another embodiment, a method of the type described above is modified to set up a multirate multi-stage network as follows. Specifically, a multirate connection can be specified as a type of multicast connection. In a multicast connection, an inlet link transmits to multiple outlet links, whereas in a multirate connection multiple inlet links transmit to a single outlet link when the rate of data transfer of all the paths in use meet the requirements of multirate connection request. In such a case a multirate connection can be set up (in a method that works backwards from the output stage to the input stage), with fan-in (instead of fan-out) of not more than two in the output stage and arbitrary fan-in in the input stages and middle stages. And a three-stage multirate network is operated in rearrangeably nonblocking manner with the exact same requirements on the number of middle stage switches as described above for certain embodiments.

Numerous such modifications and adaptations are encompassed by the attached claims.

What is claimed is:

1. A network, comprising:
   an input stage including $r_1$ input switches, each including $n_1$ inlet links;
   an output stage including $r_2$ output switches, each including $n_2$ outlet links;
   a middle stage including m middle switches, each of the m middle switches including $r_1$ first internal links connected to respective ones of the $r_1$ input switches, each of the m middle switches further including $r_2$ second internal links connected to respective ones of the $r_2$ output switches; and
   a controller connected to the input stage, the output stage, and the middle stage, the controller being configured to set up multicast connections between the input stage and the output stage, such that each of the multicast connections is fanned out from the input stage into at most x of the m middle switches, wherein x<in, and x is defined based on m, wherein m=x*$n_1$+$n_2$−1.

2. The network of claim 1, wherein the controller is configured to set up the multicast connections in a strictly nonblocking manner.

3. The network of claim 2, wherein the controller is configured to set up each of the multicast connections without rearranging an; remaining one of the multicast connections.

4. The network of claim 1, wherein x is 2.

5. The network of claim 4, wherein each of the multicast connections is connected through at most 2 of the in middle switches.

6. The network of claim 1, wherein x is 3.

7. The network of claim 6, wherein each of the multicast connections is connected through at most 3 of the m middle switches.

8. The network of claim 1, wherein $n_1$=$n_2$.

9. The network of claim 1, wherein $r_1$=$r_2$.

10. A network, comprising:
    a controller configured to:
    define a fan-out x from an input stage of the network into a middle stage of the network, the middle stage including m middle switches, wherein x<m, and x is defined based on m; and set up multicast connections between the input stage and an output stage of the network, such that each of the multicast connections is connected through at most x of the m middle switches, wherein the input stage includes $r_1$ input switches each including $n_1$ inlet links, the output stage includes $r_2$ output switches each including $n_2$ outlet links, each of the m middle switches includes $r_1$ first internal links connected to respective ones of the $r_1$ input switches, and each of the m middle switches further includes $r_2$ second internal links connected to respective ones of the $r_2$ output switches, wherein $m=x*n_1+n_2-1$.

11. The network of claim 10, wherein the controller is configured to set up the multicast connections in a strictly nonblocking manner.

12. The network of claim 11, wherein the controller is configured to set up each of the multicast connections without rearranging any remaining one of the multicast connections.

13. The network of claim 10, wherein x is 2.

14. The network of claim 13, wherein each of the multicast connections is connected through at most 2 of the m middle switches.

15. The network of claim 10, wherein x is 3.

16. The network of claim 15, wherein each of the multicast connections is connected through at most 3 of the m middle switches.

17. The network of claim 10, wherein $n_1=n_2$, and $r_1=r_2$.

* * * * *